United States Patent
Nathan et al.

(10) Patent No.: US 9,472,138 B2
(45) Date of Patent: Oct. 18, 2016

(54) PIXEL DRIVER CIRCUIT WITH LOAD-BALANCE IN CURRENT MIRROR CIRCUIT

(71) Applicant: Ignis Innovation Inc., Waterloo (CA)

(72) Inventors: Arokia Nathan, Cambridge (GB); Kapil V. Sakariya, Sunnyvale, CA (US); Peyman Servati, Vancouver (CA); Shahin Jafarabadiashtiani, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 345 days.

(21) Appl. No.: 13/933,554

(22) Filed: Jul. 2, 2013

(65) Prior Publication Data

US 2013/0334979 A1  Dec. 19, 2013

Related U.S. Application Data

(63) Continuation of application No. 10/554,795, filed as application No. PCT/CA2004/001741 on Sep. 23, 2004, now Pat. No. 8,502,751.

(30) Foreign Application Priority Data

Sep. 23, 2003  (CA) .................................... 2443206

(51) Int. Cl.
*G09G 3/3241* (2016.01)
*G09G 3/32* (2016.01)
*H05B 37/02* (2006.01)

(52) U.S. Cl.
CPC ........ *G09G 3/3241* (2013.01); *H05B 37/0209* (2013.01); *G09G 2300/0417* (2013.01); *G09G 2300/0842* (2013.01)

(58) Field of Classification Search
CPC ................... G09G 3/3241; G09G 2300/0842; G09G 2300/0417; H05B 37/0209
USPC ................ 345/20–29, 34–51, 59–68, 72–97, 345/690–694
See application file for complete search history.

(56) References Cited

U.S. PATENT DOCUMENTS 3,506,851 A   4/1970 Polkinghorn et al.
3,774,055 A   11/1973 Bapat et al.
(Continued)

FOREIGN PATENT DOCUMENTS

CA   1 294 034   1/1992
CA   2 109 951   11/1992
(Continued)

OTHER PUBLICATIONS

Ahnood et al.: "Effect of threshold voltage instability on field effect mobility in thin film transistors deduced from constant current measurements"; dated Aug. 2009 (3 pages).
(Continued)

*Primary Examiner* — Kumar Patel
*Assistant Examiner* — Vinh Lam
(74) *Attorney, Agent, or Firm* — Nixon Peabody LLP

(57) ABSTRACT

A pixel circuit for use in a display comprising a plurality of pixels is provided. The load-balanced current mirror pixel circuit can compensate for device degradation and/or mismatch, and changing environmental factors like temperature and mechanical strain. The pixel circuit comprises a pixel drive circuit comprising, switching circuitry, a current mirror having a reference transistor and a drive transistor, the reference transistor and the drive transistor each having a first and second node and a gate, the gate of the reference transistor being connected to the gate of the drive transistor; and a capacitor connected between the gate of the reference transistor and a ground potential, and a load connected between the current mirror and a ground potential, the load having a first load element and a second load element, the first load element being connected to the first node of the reference transistor and the second load element being connected to the first node of the drive transistor.

13 Claims, 15 Drawing Sheets

(56) References Cited

U.S. PATENT DOCUMENTS

| | | | |
|---|---|---|---|
| 4,090,096 A | 5/1978 | Nagami | |
| 4,160,934 A | 7/1979 | Kirsch | |
| 4,354,162 A | 10/1982 | Wright | |
| 4,758,831 A | 7/1988 | Kasahara et al. | |
| 4,847,524 A * | 7/1989 | Van Rooy | H04N 5/202 |
| | | | 327/563 |
| 4,943,956 A | 7/1990 | Noro | |
| 4,963,860 A | 10/1990 | Stewart | |
| 4,975,691 A | 12/1990 | Lee | |
| 4,996,523 A | 2/1991 | Bell et al. | |
| 5,051,739 A | 9/1991 | Hayashida et al. | |
| 5,153,420 A | 10/1992 | Hack et al. | |
| 5,198,803 A | 3/1993 | Shie et al. | |
| 5,204,661 A | 4/1993 | Hack et al. | |
| 5,222,082 A | 6/1993 | Plus | |
| 5,266,515 A | 11/1993 | Robb et al. | |
| 5,451,977 A * | 9/1995 | Kusuda | B41J 2/45 |
| | | | 257/21 |
| 5,489,918 A | 2/1996 | Mosier | |
| 5,498,880 A | 3/1996 | Lee et al. | |
| 5,572,444 A | 11/1996 | Lentz et al. | |
| 5,589,847 A | 12/1996 | Lewis | |
| 5,619,033 A | 4/1997 | Weisfield | |
| 5,648,276 A | 7/1997 | Hara et al. | |
| 5,657,097 A * | 8/1997 | Schultz | H04N 5/208 |
| | | | 327/315 |
| 5,670,973 A | 9/1997 | Bassetti et al. | |
| 5,686,935 A | 11/1997 | Weisbrod | |
| 5,691,783 A | 11/1997 | Numao et al. | |
| 5,712,653 A | 1/1998 | Katoh et al. | |
| 5,714,968 A * | 2/1998 | Ikeda | G09G 3/3233 |
| | | | 345/76 |
| 5,723,950 A | 3/1998 | Wei et al. | |
| 5,744,824 A | 4/1998 | Kousai et al. | |
| 5,745,660 A | 4/1998 | Kolpatzik et al. | |
| 5,747,928 A | 5/1998 | Shanks et al. | |
| 5,748,160 A | 5/1998 | Shieh et al. | |
| 5,784,042 A | 7/1998 | Ono et al. | |
| 5,790,234 A | 8/1998 | Matsuyama | |
| 5,815,303 A | 9/1998 | Berlin | |
| 5,870,071 A | 2/1999 | Kawahata | |
| 5,874,803 A | 2/1999 | Garbuzov et al. | |
| 5,880,582 A | 3/1999 | Sawada | |
| 5,903,248 A | 5/1999 | Irwin | |
| 5,917,280 A | 6/1999 | Burrows et al. | |
| 5,923,794 A | 7/1999 | McGrath et al. | |
| 5,945,972 A | 8/1999 | Okumura et al. | |
| 5,949,398 A | 9/1999 | Kim | |
| 5,952,789 A | 9/1999 | Stewart et al. | |
| 5,952,991 A | 9/1999 | Akiyama et al. | |
| 5,982,104 A | 11/1999 | Sasaki et al. | |
| 5,990,629 A | 11/1999 | Yamada et al. | |
| 6,023,259 A | 2/2000 | Howard et al. | |
| 6,069,365 A | 5/2000 | Chow et al. | |
| 6,091,203 A | 7/2000 | Kawashima et al. | |
| 6,097,360 A | 8/2000 | Holloman | |
| 6,144,222 A | 11/2000 | Ho | |
| 6,177,915 B1 | 1/2001 | Beeteson et al. | |
| 6,229,506 B1 | 5/2001 | Dawson et al. | |
| 6,229,508 B1 | 5/2001 | Kane | |
| 6,232,939 B1 | 5/2001 | Saito et al. | |
| 6,246,180 B1 | 6/2001 | Nishigaki | |
| 6,252,248 B1 | 6/2001 | Sano et al. | |
| 6,259,424 B1 | 7/2001 | Kurogane | |
| 6,262,589 B1 | 7/2001 | Tamukai | |
| 6,271,825 B1 | 8/2001 | Greene et al. | |
| 6,274,887 B1 | 8/2001 | Yamazaki et al. | |
| 6,288,696 B1 | 9/2001 | Holloman | |
| 6,300,928 B1 | 10/2001 | Kim | |
| 6,303,963 B1 | 10/2001 | Ohtani et al. | |
| 6,304,039 B1 | 10/2001 | Appelberg et al. | |
| 6,306,694 B1 | 10/2001 | Yamazaki et al. | |
| 6,307,322 B1 | 10/2001 | Dawson et al. | |
| 6,310,962 B1 | 10/2001 | Chung et al. | |
| 6,316,786 B1 | 11/2001 | Mueller et al. | |
| 6,320,325 B1 | 11/2001 | Cok et al. | |
| 6,323,631 B1 | 11/2001 | Juang | |
| 6,323,832 B1 | 11/2001 | Nishizawa et al. | |
| 6,345,085 B1 | 2/2002 | Yeo et al. | |
| 6,356,029 B1 | 3/2002 | Hunter | |
| 6,365,917 B1 | 4/2002 | Yamazaki | |
| 6,373,453 B1 | 4/2002 | Yudasaka | |
| 6,373,454 B1 | 4/2002 | Knapp et al. | |
| 6,384,427 B1 | 5/2002 | Yamazaki et al. | |
| 6,392,617 B1 | 5/2002 | Gleason | |
| 6,399,988 B1 | 6/2002 | Yamazaki | |
| 6,414,661 B1 | 7/2002 | Shen et al. | |
| 6,417,825 B1 | 7/2002 | Stewart et al. | |
| 6,420,758 B1 | 7/2002 | Nakajima | |
| 6,420,834 B2 | 7/2002 | Yamazaki et al. | |
| 6,420,988 B1 | 7/2002 | Azami et al. | |
| 6,433,488 B1 | 8/2002 | Bu | |
| 6,437,106 B1 | 8/2002 | Stoner et al. | |
| 6,445,369 B1 | 9/2002 | Yang et al. | |
| 6,445,376 B2 | 9/2002 | Parrish | |
| 6,468,638 B2 | 10/2002 | Jacobsen et al. | |
| 6,475,845 B2 | 11/2002 | Kimura | |
| 6,489,952 B1 | 12/2002 | Tanaka et al. | |
| 6,501,098 B2 | 12/2002 | Yamazaki | |
| 6,501,466 B1 | 12/2002 | Yamagashi et al. | |
| 6,512,271 B1 | 1/2003 | Yamazaki et al. | |
| 6,518,594 B1 | 2/2003 | Nakajima et al. | |
| 6,522,315 B2 | 2/2003 | Ozawa et al. | |
| 6,524,895 B2 | 2/2003 | Yamazaki et al. | |
| 6,525,683 B1 | 2/2003 | Gu | |
| 6,531,713 B1 | 3/2003 | Yamazaki | |
| 6,531,827 B2 | 3/2003 | Kawashima | |
| 6,542,138 B1 | 4/2003 | Shannon et al. | |
| 6,559,594 B2 | 5/2003 | Fukunaga et al. | |
| 6,573,195 B1 | 6/2003 | Yamazaki et al. | |
| 6,573,584 B1 | 6/2003 | Nagakari et al. | |
| 6,576,926 B1 | 6/2003 | Yamazaki et al. | |
| 6,580,063 B1 * | 6/2003 | Okamoto | H04N 3/1512 |
| | | | 250/208.1 |
| 6,580,408 B1 | 6/2003 | Bae et al. | |
| 6,580,657 B2 | 6/2003 | Sanford et al. | |
| 6,583,398 B2 | 6/2003 | Harkin | |
| 6,583,775 B1 | 6/2003 | Sekiya et al. | |
| 6,583,776 B2 | 6/2003 | Yamazaki et al. | |
| 6,587,086 B1 | 7/2003 | Koyama | |
| 6,593,691 B2 | 7/2003 | Nishi et al. | |
| 6,594,606 B2 | 7/2003 | Everitt | |
| 6,597,203 B2 | 7/2003 | Forbes | |
| 6,611,108 B2 | 8/2003 | Kimura | |
| 6,617,644 B1 | 9/2003 | Yamazaki et al. | |
| 6,618,030 B2 | 9/2003 | Kane et al. | |
| 6,639,244 B1 | 10/2003 | Yamazaki et al. | |
| 6,641,933 B1 | 11/2003 | Yamazaki et al. | |
| 6,661,180 B2 | 12/2003 | Koyama | |
| 6,661,397 B2 | 12/2003 | Mikami et al. | |
| 6,668,645 B1 | 12/2003 | Gilmour et al. | |
| 6,670,637 B2 | 12/2003 | Yamazaki et al. | |
| 6,677,713 B1 | 1/2004 | Sung | |
| 6,680,577 B1 | 1/2004 | Inukai et al. | |
| 6,680,580 B1 | 1/2004 | Sung | |
| 6,687,266 B1 | 2/2004 | Ma et al. | |
| 6,690,000 B1 | 2/2004 | Muramatsu et al. | |
| 6,690,344 B1 | 2/2004 | Takeuchi et al. | |
| 6,693,388 B2 | 2/2004 | Oomura | |
| 6,693,610 B2 | 2/2004 | Shannon et al. | |
| 6,697,057 B2 | 2/2004 | Koyama et al. | |
| 6,720,942 B2 | 4/2004 | Lee et al. | |
| 6,724,151 B2 | 4/2004 | Yoo | |
| 6,734,636 B2 | 5/2004 | Sanford et al. | |
| 6,738,034 B2 | 5/2004 | Kaneko et al. | |
| 6,738,035 B1 | 5/2004 | Fan | |
| 6,747,417 B2 * | 6/2004 | Meade | G09G 3/3283 |
| | | | 315/169.1 |
| 6,753,655 B2 | 6/2004 | Shih et al. | |
| 6,753,834 B2 | 6/2004 | Mikami et al. | |
| 6,756,741 B2 | 6/2004 | Li | |
| 6,756,952 B1 | 6/2004 | Decaux et al. | |
| 6,756,985 B1 | 6/2004 | Hirotsune et al. | |
| 6,771,028 B1 | 8/2004 | Winters | |

(56) References Cited

U.S. PATENT DOCUMENTS

| | | | |
|---|---|---|---|
| 6,777,712 B2 | 8/2004 | Sanford et al. |
| 6,777,888 B2 | 8/2004 | Kondo |
| 6,780,687 B2 | 8/2004 | Nakajima et al. |
| 6,781,567 B2 | 8/2004 | Kimura |
| 6,806,497 B2 | 10/2004 | Jo |
| 6,806,638 B2 | 10/2004 | Lih et al. |
| 6,806,857 B2 | 10/2004 | Sempel et al. |
| 6,809,706 B2 | 10/2004 | Shimoda |
| 6,815,975 B2 | 11/2004 | Nara et al. |
| 6,828,950 B2 | 12/2004 | Koyama |
| 6,833,869 B1 * | 12/2004 | Okamoto ............... H04N 5/378 250/208.1 |
| 6,853,371 B2 | 2/2005 | Miyajima et al. |
| 6,859,193 B1 | 2/2005 | Yumoto |
| 6,861,670 B1 | 3/2005 | Ohtani et al. |
| 6,873,117 B2 | 3/2005 | Ishizuka |
| 6,873,320 B2 | 3/2005 | Nakamura |
| 6,876,346 B2 | 4/2005 | Anzai et al. |
| 6,878,968 B1 | 4/2005 | Ohnuma |
| 6,885,356 B2 | 4/2005 | Hashimoto |
| 6,900,485 B2 | 5/2005 | Lee |
| 6,903,734 B2 | 6/2005 | Eu |
| 6,909,114 B1 | 6/2005 | Yamazaki |
| 6,909,243 B2 | 6/2005 | Inukai |
| 6,909,419 B2 | 6/2005 | Zavracky et al. |
| 6,911,960 B1 | 6/2005 | Yokoyama |
| 6,911,964 B2 | 6/2005 | Lee et al. |
| 6,914,448 B2 | 7/2005 | Jinno |
| 6,919,871 B2 | 7/2005 | Kwon |
| 6,924,602 B2 | 8/2005 | Komiya |
| 6,937,215 B2 | 8/2005 | Lo |
| 6,937,220 B2 | 8/2005 | Kitaura et al. |
| 6,940,214 B1 | 9/2005 | Komiya et al. |
| 6,943,500 B2 | 9/2005 | LeChevalier |
| 6,947,022 B2 | 9/2005 | McCartney |
| 6,954,194 B2 | 10/2005 | Matsumoto et al. |
| 6,956,547 B2 | 10/2005 | Bae et al. |
| 6,972,526 B2 * | 12/2005 | Abe ............... G11C 5/147 315/169.3 |
| 6,975,142 B2 | 12/2005 | Azami et al. |
| 6,975,332 B2 | 12/2005 | Arnold et al. |
| 6,995,510 B2 | 2/2006 | Murakami et al. |
| 6,995,519 B2 | 2/2006 | Arnold et al. |
| 7,022,556 B1 | 4/2006 | Adachi |
| 7,023,408 B2 | 4/2006 | Chen et al. |
| 7,027,015 B2 | 4/2006 | Booth, Jr. et al. |
| 7,027,078 B2 | 4/2006 | Reihl |
| 7,034,793 B2 | 4/2006 | Sekiya et al. |
| 7,038,392 B2 | 5/2006 | Libsch et al. |
| 7,057,359 B2 | 6/2006 | Hung et al. |
| 7,061,451 B2 | 6/2006 | Kimura |
| 7,064,733 B2 | 6/2006 | Cok et al. |
| 7,071,932 B2 | 7/2006 | Libsch et al. |
| 7,088,051 B1 | 8/2006 | Cok |
| 7,088,052 B2 | 8/2006 | Kimura |
| 7,102,378 B2 | 9/2006 | Kuo et al. |
| 7,105,855 B2 * | 9/2006 | Winters ............... G09G 3/3241 257/40 |
| 7,106,285 B2 | 9/2006 | Naugler |
| 7,112,820 B2 | 9/2006 | Change et al. |
| 7,116,058 B2 | 10/2006 | Lo et al. |
| 7,119,493 B2 | 10/2006 | Fryer et al. |
| 7,122,835 B1 | 10/2006 | Ikeda et al. |
| 7,127,380 B1 | 10/2006 | Iverson et al. |
| 7,129,914 B2 | 10/2006 | Knapp et al. |
| 7,129,917 B2 | 10/2006 | Yamazaki et al. |
| 7,141,821 B1 | 11/2006 | Yamazaki et al. |
| 7,164,417 B2 | 1/2007 | Cok |
| 7,193,589 B2 | 3/2007 | Yoshida et al. |
| 7,199,516 B2 | 4/2007 | Seo et al. |
| 7,220,997 B2 | 5/2007 | Nakata |
| 7,224,332 B2 | 5/2007 | Cok |
| 7,227,519 B1 | 6/2007 | Kawase et al. |
| 7,235,810 B1 | 6/2007 | Yamazaki et al. |
| 7,245,277 B2 | 7/2007 | Ishizuka |
| 7,248,236 B2 | 7/2007 | Nathan et al. |
| 7,262,753 B2 | 8/2007 | Tanghe et al. |
| 7,264,979 B2 | 9/2007 | Yamagata et al. |
| 7,274,345 B2 | 9/2007 | Imamura et al. |
| 7,274,363 B2 | 9/2007 | Ishizuka et al. |
| 7,279,711 B1 | 10/2007 | Yamazaki et al. |
| 7,304,621 B2 | 12/2007 | Oomori et al. |
| 7,310,092 B2 | 12/2007 | Imamura |
| 7,315,295 B2 | 1/2008 | Kimura |
| 7,319,465 B2 | 1/2008 | Mikami et al. |
| 7,321,348 B2 | 1/2008 | Cok et al. |
| 7,339,560 B2 | 3/2008 | Sun |
| 7,339,636 B2 | 3/2008 | Voloschenko et al. |
| 7,355,574 B1 | 4/2008 | Leon et al. |
| 7,358,941 B2 | 4/2008 | Ono et al. |
| 7,368,868 B2 | 5/2008 | Sakamoto |
| 7,402,467 B1 | 7/2008 | Kadono et al. |
| 7,411,571 B2 | 8/2008 | Huh |
| 7,414,600 B2 | 8/2008 | Nathan et al. |
| 7,423,617 B2 | 9/2008 | Giraldo et al. |
| 7,432,885 B2 | 10/2008 | Asano et al. |
| 7,474,285 B2 | 1/2009 | Kimura |
| 7,485,478 B2 | 2/2009 | Yamagata et al. |
| 7,502,000 B2 | 3/2009 | Yuki et al. |
| 7,525,119 B2 * | 4/2009 | Koyama ............... H01L 27/124 257/350 |
| 7,528,812 B2 | 5/2009 | Tsuge et al. |
| 7,535,449 B2 | 5/2009 | Miyazawa |
| 7,554,512 B2 | 6/2009 | Steer |
| 7,569,849 B2 | 8/2009 | Nathan et al. |
| 7,576,718 B2 | 8/2009 | Miyazawa |
| 7,580,012 B2 | 8/2009 | Kim et al. |
| 7,589,707 B2 | 9/2009 | Chou |
| 7,609,239 B2 | 10/2009 | Chang |
| 7,619,594 B2 | 11/2009 | Hu |
| 7,619,597 B2 | 11/2009 | Nathan et al. |
| 7,633,470 B2 | 12/2009 | Kane |
| 7,656,370 B2 | 2/2010 | Schneider et al. |
| 7,697,052 B1 | 4/2010 | Yamazaki et al. |
| 7,750,281 B2 * | 7/2010 | Asaba ............... H01L 27/14609 250/208.1 |
| 7,777,698 B2 * | 8/2010 | Takahara ............... G09G 3/006 345/204 |
| 7,800,558 B2 | 9/2010 | Routley et al. |
| 7,825,419 B2 | 11/2010 | Yamagata et al. |
| 7,847,764 B2 | 12/2010 | Cok et al. |
| 7,859,492 B2 | 12/2010 | Kohno |
| 7,864,143 B2 * | 1/2011 | Kimura ............... G09G 3/3233 345/82 |
| 7,868,859 B2 | 1/2011 | Tomida et al. |
| 7,876,294 B2 | 1/2011 | Sasaki et al. |
| 7,924,249 B2 | 4/2011 | Nathan et al. |
| 7,932,883 B2 | 4/2011 | Klompenhouwer et al. |
| 7,948,170 B2 | 5/2011 | Striakhilev et al. |
| 7,969,390 B2 | 6/2011 | Yoshida |
| 7,978,187 B2 | 7/2011 | Nathan et al. |
| 7,994,712 B2 | 8/2011 | Sung et al. |
| 7,995,010 B2 | 8/2011 | Yamazaki et al. |
| 8,026,876 B2 | 9/2011 | Nathan et al. |
| 8,044,893 B2 | 10/2011 | Nathan et al. |
| 8,049,420 B2 | 11/2011 | Tamura et al. |
| 8,077,123 B2 | 12/2011 | Naugler, Jr. |
| 8,115,707 B2 | 2/2012 | Nathan et al. |
| 8,223,177 B2 | 7/2012 | Nathan et al. |
| 8,232,939 B2 | 7/2012 | Nathan et al. |
| 8,259,044 B2 | 9/2012 | Nathan et al. |
| 8,264,431 B2 | 9/2012 | Bulovic et al. |
| 8,279,143 B2 | 10/2012 | Nathan et al. |
| 8,339,386 B2 | 12/2012 | Leon et al. |
| 8,493,295 B2 | 7/2013 | Yamazaki et al. |
| 8,497,525 B2 | 7/2013 | Yamagata et al. |
| 8,519,392 B2 * | 8/2013 | Yamazaki ............ G09G 3/3241 257/20 |
| 8,599,109 B2 * | 12/2013 | Kimura ............... G09G 3/3241 345/73 |
| 8,664,644 B2 * | 3/2014 | Nathan ............... G09G 3/3233 257/13 |
| 2001/0002703 A1 | 6/2001 | Koyama |
| 2001/0004190 A1 | 6/2001 | Nishi et al. |

(56) References Cited

U.S. PATENT DOCUMENTS

| | | |
|---|---|---|
| 2001/0009283 A1 | 7/2001 | Arao et al. |
| 2001/0020926 A1 | 9/2001 | Kujik |
| 2001/0024181 A1 | 9/2001 | Kubota |
| 2001/0024186 A1 | 9/2001 | Kane et al. |
| 2001/0026127 A1 | 10/2001 | Yoneda et al. |
| 2001/0026179 A1 | 10/2001 | Saeki |
| 2001/0026257 A1 | 10/2001 | Kimura |
| 2001/0030323 A1 | 10/2001 | Ikeda |
| 2001/0038098 A1 | 11/2001 | Yamazaki et al. |
| 2001/0040541 A1 | 11/2001 | Yoneda et al. |
| 2001/0043173 A1 | 11/2001 | Troutman |
| 2001/0045929 A1 | 11/2001 | Prache |
| 2001/0052606 A1 | 12/2001 | Sempel et al. |
| 2001/0052898 A1 | 12/2001 | Osame et al. |
| 2001/0052940 A1 | 12/2001 | Hagihara et al. |
| 2002/0000576 A1 | 1/2002 | Inukai |
| 2002/0011796 A1 | 1/2002 | Koyama |
| 2002/0011799 A1 | 1/2002 | Kimura |
| 2002/0011981 A1 | 1/2002 | Kujik |
| 2002/0012057 A1 | 1/2002 | Kimura |
| 2002/0014851 A1 | 2/2002 | Tai et al. |
| 2002/0015031 A1 | 2/2002 | Fujita et al. |
| 2002/0015032 A1 | 2/2002 | Koyama et al. |
| 2002/0018034 A1 | 2/2002 | Ohki et al. |
| 2002/0030190 A1 | 3/2002 | Ohtani et al. |
| 2002/0030528 A1 | 3/2002 | Matsumoto et al. |
| 2002/0030647 A1 | 3/2002 | Hack et al. |
| 2002/0036463 A1 | 3/2002 | Yoneda et al. |
| 2002/0047565 A1 | 4/2002 | Nara et al. |
| 2002/0047852 A1 | 4/2002 | Inukai et al. |
| 2002/0048829 A1 | 4/2002 | Yamazaki et al. |
| 2002/0050795 A1 | 5/2002 | Imura |
| 2002/0052086 A1 | 5/2002 | Maeda |
| 2002/0053401 A1 | 5/2002 | Ishikawa et al. |
| 2002/0067134 A1 | 6/2002 | Kawashima |
| 2002/0070909 A1 | 6/2002 | Asano et al. |
| 2002/0080108 A1 | 6/2002 | Wang |
| 2002/0084463 A1 | 7/2002 | Sanford et al. |
| 2002/0101172 A1 | 8/2002 | Bu |
| 2002/0101433 A1 | 8/2002 | McKnight |
| 2002/0105279 A1 | 8/2002 | Kimura |
| 2002/0113248 A1 | 8/2002 | Yamagata et al. |
| 2002/0117722 A1 | 8/2002 | Osada et al. |
| 2002/0122308 A1 | 9/2002 | Ikeda |
| 2002/0130686 A1 | 9/2002 | Forbes |
| 2002/0154084 A1 | 10/2002 | Tanaka et al. |
| 2002/0158587 A1 | 10/2002 | Komiya |
| 2002/0158666 A1 | 10/2002 | Azami et al. |
| 2002/0158823 A1 | 10/2002 | Zavracky et al. |
| 2002/0163314 A1 | 11/2002 | Yamazaki et al. |
| 2002/0167474 A1 | 11/2002 | Everitt |
| 2002/0180369 A1* | 12/2002 | Koyama ............... C09K 11/06 315/169.1 |
| 2002/0180721 A1 | 12/2002 | Kimura et al. |
| 2002/0186214 A1 | 12/2002 | Siwinski |
| 2002/0190332 A1 | 12/2002 | Lee et al. |
| 2002/0190924 A1 | 12/2002 | Asano et al. |
| 2002/0190971 A1 | 12/2002 | Nakamura et al. |
| 2002/0195967 A1 | 12/2002 | Kim et al. |
| 2002/0195968 A1 | 12/2002 | Sanford et al. |
| 2003/0020413 A1 | 1/2003 | Oomura |
| 2003/0030603 A1 | 2/2003 | Shimoda |
| 2003/0043088 A1 | 3/2003 | Booth et al. |
| 2003/0057895 A1 | 3/2003 | Kimura |
| 2003/0058226 A1 | 3/2003 | Bertram et al. |
| 2003/0062524 A1 | 4/2003 | Kimura |
| 2003/0063081 A1 | 4/2003 | Kimura et al. |
| 2003/0071821 A1 | 4/2003 | Sundahl et al. |
| 2003/0076048 A1 | 4/2003 | Rutherford |
| 2003/0090445 A1 | 5/2003 | Chen et al. |
| 2003/0090447 A1 | 5/2003 | Kimura |
| 2003/0090481 A1 | 5/2003 | Kimura |
| 2003/0095087 A1 | 5/2003 | Libsch |
| 2003/0107560 A1 | 6/2003 | Yumoto et al. |
| 2003/0111966 A1 | 6/2003 | Mikami et al. |
| 2003/0122745 A1 | 7/2003 | Miyazawa |
| 2003/0122813 A1 | 7/2003 | Ishizuki et al. |
| 2003/0140958 A1 | 7/2003 | Yang et al. |
| 2003/0142088 A1 | 7/2003 | LeChevalier |
| 2003/0151569 A1 | 8/2003 | Lee et al. |
| 2003/0156101 A1 | 8/2003 | Le Chevalier |
| 2003/0169219 A1 | 9/2003 | LeChevalier |
| 2003/0174152 A1 | 9/2003 | Noguchi |
| 2003/0179626 A1 | 9/2003 | Sanford et al. |
| 2003/0197663 A1 | 10/2003 | Lee et al. |
| 2003/0210256 A1 | 11/2003 | Mori et al. |
| 2003/0230141 A1 | 12/2003 | Gilmour et al. |
| 2003/0230980 A1 | 12/2003 | Forrest et al. |
| 2003/0231148 A1 | 12/2003 | Lin et al. |
| 2004/0027063 A1 | 2/2004 | Nishikawa |
| 2004/0032382 A1 | 2/2004 | Cok et al. |
| 2004/0056604 A1 | 3/2004 | Shih et al. |
| 2004/0066357 A1 | 4/2004 | Kawasaki |
| 2004/0070557 A1 | 4/2004 | Asano et al. |
| 2004/0070565 A1 | 4/2004 | Nayar et al. |
| 2004/0080262 A1 | 4/2004 | Park et al. |
| 2004/0080470 A1 | 4/2004 | Yamazaki et al. |
| 2004/0090400 A1 | 5/2004 | Yoo |
| 2004/0095297 A1 | 5/2004 | Libsch et al. |
| 2004/0100427 A1 | 5/2004 | Miyazawa |
| 2004/0108518 A1 | 6/2004 | Jo |
| 2004/0113903 A1 | 6/2004 | Mikami et al. |
| 2004/0129933 A1 | 7/2004 | Nathan et al. |
| 2004/0130516 A1 | 7/2004 | Nathan et al. |
| 2004/0135749 A1 | 7/2004 | Kondakov et al. |
| 2004/0145547 A1 | 7/2004 | Oh |
| 2004/0150592 A1 | 8/2004 | Mizukoshi et al. |
| 2004/0150594 A1 | 8/2004 | Koyama et al. |
| 2004/0150595 A1 | 8/2004 | Kasai |
| 2004/0155841 A1 | 8/2004 | Kasai |
| 2004/0174347 A1 | 9/2004 | Sun et al. |
| 2004/0174349 A1 | 9/2004 | Libsch |
| 2004/0174354 A1 | 9/2004 | Ono et al. |
| 2004/0178743 A1 | 9/2004 | Miller et al. |
| 2004/0183759 A1 | 9/2004 | Stevenson et al. |
| 2004/0189627 A1 | 9/2004 | Shirasaki et al. |
| 2004/0196275 A1 | 10/2004 | Hattori |
| 2004/0201554 A1 | 10/2004 | Satoh |
| 2004/0207615 A1 | 10/2004 | Yumoto |
| 2004/0239596 A1 | 12/2004 | Ono et al. |
| 2004/0252089 A1 | 12/2004 | Ono et al. |
| 2004/0257313 A1 | 12/2004 | Kawashima et al. |
| 2004/0257353 A1 | 12/2004 | Imamura et al. |
| 2004/0257355 A1 | 12/2004 | Naugler |
| 2004/0263437 A1 | 12/2004 | Hattori |
| 2004/0263444 A1 | 12/2004 | Kimura |
| 2004/0263445 A1 | 12/2004 | Inukai et al. |
| 2004/0263541 A1 | 12/2004 | Takeuchi et al. |
| 2005/0007355 A1 | 1/2005 | Miura |
| 2005/0007357 A1 | 1/2005 | Yamashita et al. |
| 2005/0017650 A1 | 1/2005 | Fryer et al. |
| 2005/0024081 A1 | 2/2005 | Kuo et al. |
| 2005/0024393 A1 | 2/2005 | Kondo et al. |
| 2005/0030267 A1 | 2/2005 | Tanghe et al. |
| 2005/0035709 A1 | 2/2005 | Furuie et al. |
| 2005/0057580 A1 | 3/2005 | Yamano et al. |
| 2005/0067970 A1 | 3/2005 | Libsch et al. |
| 2005/0067971 A1 | 3/2005 | Kane |
| 2005/0068270 A1 | 3/2005 | Awakura |
| 2005/0068275 A1 | 3/2005 | Kane |
| 2005/0073264 A1 | 4/2005 | Matsumoto |
| 2005/0083323 A1 | 4/2005 | Suzuki et al. |
| 2005/0088103 A1 | 4/2005 | Kageyama et al. |
| 2005/0110420 A1 | 5/2005 | Arnold et al. |
| 2005/0110807 A1 | 5/2005 | Chang |
| 2005/0117096 A1 | 6/2005 | Voloschenko et al. |
| 2005/0140598 A1 | 6/2005 | Kim et al. |
| 2005/0140610 A1 | 6/2005 | Smith et al. |
| 2005/0145891 A1 | 7/2005 | Abe |
| 2005/0156831 A1 | 7/2005 | Yamazaki et al. |
| 2005/0168416 A1 | 8/2005 | Hashimoto et al. |
| 2005/0179626 A1 | 8/2005 | Yuki et al. |
| 2005/0179628 A1 | 8/2005 | Kimura |
| 2005/0185200 A1 | 8/2005 | Tobol |

(56) References Cited

U.S. PATENT DOCUMENTS

| | | |
|---|---|---|
| 2005/0200575 A1 | 9/2005 | Kim et al. |
| 2005/0206590 A1 | 9/2005 | Sasaki et al. |
| 2005/0219184 A1 | 10/2005 | Zehner et al. |
| 2005/0225686 A1 | 10/2005 | Brummack et al. |
| 2005/0248515 A1 | 11/2005 | Naugler et al. |
| 2005/0260777 A1 | 11/2005 | Brabec et al. |
| 2005/0269959 A1 | 12/2005 | Uchino et al. |
| 2005/0269960 A1 | 12/2005 | Ono et al. |
| 2005/0280615 A1 | 12/2005 | Cok et al. |
| 2005/0280766 A1 | 12/2005 | Johnson et al. |
| 2005/0285822 A1 | 12/2005 | Reddy et al. |
| 2005/0285825 A1 | 12/2005 | Eom et al. |
| 2006/0001613 A1 | 1/2006 | Routley et al. |
| 2006/0007072 A1 | 1/2006 | Choi et al. |
| 2006/0012310 A1 | 1/2006 | Chen et al. |
| 2006/0012311 A1 | 1/2006 | Ogawa |
| 2006/0027807 A1 | 2/2006 | Nathan et al. |
| 2006/0030084 A1 | 2/2006 | Young |
| 2006/0038758 A1 | 2/2006 | Routley et al. |
| 2006/0038762 A1 | 2/2006 | Chou |
| 2006/0066527 A1 | 3/2006 | Chou |
| 2006/0066533 A1 | 3/2006 | Sato et al. |
| 2006/0077135 A1 | 4/2006 | Cok et al. |
| 2006/0082523 A1 | 4/2006 | Guo et al. |
| 2006/0092185 A1 | 5/2006 | Jo et al. |
| 2006/0097628 A1 | 5/2006 | Suh et al. |
| 2006/0097631 A1 | 5/2006 | Lee |
| 2006/0103611 A1 | 5/2006 | Choi |
| 2006/0149493 A1 | 7/2006 | Sambandan et al. |
| 2006/0170623 A1 | 8/2006 | Naugler, Jr. et al. |
| 2006/0176250 A1 | 8/2006 | Nathan et al. |
| 2006/0208961 A1 | 9/2006 | Nathan et al. |
| 2006/0232522 A1 | 10/2006 | Roy et al. |
| 2006/0244697 A1 | 11/2006 | Lee et al. |
| 2006/0250331 A1* | 11/2006 | Sempel .............. G09G 3/3241 345/76 |
| 2006/0261841 A1 | 11/2006 | Fish |
| 2006/0264143 A1 | 11/2006 | Lee et al. |
| 2006/0273997 A1 | 12/2006 | Nathan et al. |
| 2006/0284801 A1 | 12/2006 | Yoon et al. |
| 2006/0284895 A1 | 12/2006 | Marcu et al. |
| 2006/0290618 A1 | 12/2006 | Goto |
| 2007/0001937 A1 | 1/2007 | Park et al. |
| 2007/0001939 A1 | 1/2007 | Hashimoto et al. |
| 2007/0008268 A1 | 1/2007 | Park et al. |
| 2007/0008297 A1 | 1/2007 | Bassetti |
| 2007/0057873 A1 | 3/2007 | Uchino et al. |
| 2007/0069998 A1 | 3/2007 | Naugler et al. |
| 2007/0075727 A1 | 4/2007 | Nakano et al. |
| 2007/0076226 A1 | 4/2007 | Klompenhouwer et al. |
| 2007/0080905 A1* | 4/2007 | Takahara .............. G09G 3/3233 345/76 |
| 2007/0080906 A1 | 4/2007 | Tanabe |
| 2007/0080908 A1 | 4/2007 | Nathan et al. |
| 2007/0080918 A1 | 4/2007 | Kawachi et al. |
| 2007/0097038 A1 | 5/2007 | Yamazaki et al. |
| 2007/0097041 A1 | 5/2007 | Park et al. |
| 2007/0103419 A1 | 5/2007 | Uchino et al. |
| 2007/0115221 A1 | 5/2007 | Buchhauser et al. |
| 2007/0182671 A1 | 8/2007 | Nathan et al. |
| 2007/0236517 A1 | 10/2007 | Kimpe |
| 2007/0241999 A1 | 10/2007 | Lin |
| 2007/0273294 A1 | 11/2007 | Nagayama |
| 2007/0285359 A1 | 12/2007 | Ono |
| 2007/0290958 A1 | 12/2007 | Cok |
| 2007/0296672 A1 | 12/2007 | Kim et al. |
| 2008/0001525 A1 | 1/2008 | Chao et al. |
| 2008/0001544 A1 | 1/2008 | Murakami et al. |
| 2008/0036708 A1 | 2/2008 | Shirasaki |
| 2008/0042942 A1 | 2/2008 | Takahashi |
| 2008/0042948 A1 | 2/2008 | Yamashita et al. |
| 2008/0048951 A1 | 2/2008 | Naugler, Jr. et al. |
| 2008/0055209 A1 | 3/2008 | Cok |
| 2008/0074413 A1 | 3/2008 | Ogura |
| 2008/0088549 A1 | 4/2008 | Nathan et al. |
| 2008/0088648 A1 | 4/2008 | Nathan et al. |
| 2008/0117144 A1 | 5/2008 | Nakano et al. |
| 2008/0150847 A1 | 6/2008 | Kim et al. |
| 2008/0231558 A1 | 9/2008 | Naugler |
| 2008/0231562 A1 | 9/2008 | Kwon |
| 2008/0252571 A1 | 10/2008 | Hente et al. |
| 2008/0290805 A1 | 11/2008 | Yamada et al. |
| 2008/0297055 A1 | 12/2008 | Miyake et al. |
| 2009/0032807 A1 | 2/2009 | Shinohara et al. |
| 2009/0058772 A1 | 3/2009 | Lee |
| 2009/0160743 A1 | 6/2009 | Tomida et al. |
| 2009/0174628 A1 | 7/2009 | Wang et al. |
| 2009/0184901 A1 | 7/2009 | Kwon |
| 2009/0195483 A1 | 8/2009 | Naugler, Jr. et al. |
| 2009/0201281 A1 | 8/2009 | Routley et al. |
| 2009/0213046 A1 | 8/2009 | Nam |
| 2010/0004891 A1 | 1/2010 | Ahlers et al. |
| 2010/0026725 A1 | 2/2010 | Smith |
| 2010/0060911 A1 | 3/2010 | Marcu et al. |
| 2010/0079711 A1 | 4/2010 | Tanaka |
| 2010/0165002 A1 | 7/2010 | Ahn |
| 2010/0194670 A1 | 8/2010 | Cok |
| 2010/0207960 A1 | 8/2010 | Kimpe et al. |
| 2010/0277400 A1 | 11/2010 | Jeong |
| 2010/0315319 A1 | 12/2010 | Cok et al. |
| 2010/0328294 A1 | 12/2010 | Sasaki et al. |
| 2011/0069051 A1 | 3/2011 | Nakamura et al. |
| 2011/0069089 A1 | 3/2011 | Kopf et al. |
| 2011/0074750 A1 | 3/2011 | Leon et al. |
| 2011/0090210 A1 | 4/2011 | Sasaki et al. |
| 2011/0149166 A1 | 6/2011 | Botzas et al. |
| 2011/0227964 A1 | 9/2011 | Chaji et al. |
| 2011/0293480 A1 | 12/2011 | Mueller |
| 2012/0056558 A1 | 3/2012 | Toshiya et al. |
| 2012/0062565 A1 | 3/2012 | Fuchs et al. |
| 2012/0299978 A1 | 11/2012 | Chaji |
| 2013/0027381 A1 | 1/2013 | Nathan et al. |
| 2013/0057595 A1 | 3/2013 | Nathan et al. |

FOREIGN PATENT DOCUMENTS

| | | |
|---|---|---|
| CA | 2 249 592 | 7/1998 |
| CA | 2 368 386 | 9/1999 |
| CA | 2 242 720 | 1/2000 |
| CA | 2 354 018 | 6/2000 |
| CA | 2 432 530 | 7/2002 |
| CA | 2 436 451 | 8/2002 |
| CA | 2 438 577 | 8/2002 |
| CA | 2 483 645 | 12/2003 |
| CA | 2 463 653 | 1/2004 |
| CA | 2 498 136 | 3/2004 |
| CA | 2 522 396 | 11/2004 |
| CA | 2 443 206 | 3/2005 |
| CA | 2 472 671 | 12/2005 |
| CA | 2 567 076 | 1/2006 |
| CA | 2 526 782 | 4/2006 |
| CA | 2 550 102 | 4/2008 |
| CN | 1381032 | 11/2002 |
| CN | 1448908 | 10/2003 |
| CN | 1760945 | 4/2006 |
| DE | 20 2006 005427 | 6/2006 |
| EP | 0 158 366 | 10/1985 |
| EP | 0 940 796 | 9/1999 |
| EP | 1 028 471 A | 8/2000 |
| EP | 1 103 947 | 5/2001 |
| EP | 1 111 577 | 6/2001 |
| EP | 1 130 565 A1 | 9/2001 |
| EP | 1 184 833 | 3/2002 |
| EP | 1 194 013 | 4/2002 |
| EP | 1 310 939 | 5/2003 |
| EP | 1 335 430 A1 | 8/2003 |
| EP | 1 372 136 | 12/2003 |
| EP | 1 381 019 | 1/2004 |
| EP | 1 418 566 | 5/2004 |
| EP | 1 429 312 A | 6/2004 |
| EP | 1 439 520 | 7/2004 |
| EP | 1 465 143 A | 10/2004 |
| EP | 1 467 408 | 10/2004 |
| EP | 1 469 448 A | 10/2004 |

(56) References Cited

FOREIGN PATENT DOCUMENTS

| | | |
|---|---|---|
| EP | 1 517 290 | 3/2005 |
| EP | 1 521 203 A2 | 4/2005 |
| EP | 1 594 347 | 11/2005 |
| EP | 1 784 055 A2 | 5/2007 |
| EP | 1 879 169 A1 | 1/2008 |
| EP | 1 879 172 | 1/2008 |
| GB | 2 205 431 | 12/1988 |
| GB | 2 389 951 | 12/2003 |
| JP | 1 272 298 | 10/1989 |
| JP | 4-042619 | 2/1992 |
| JP | 6-314977 | 11/1994 |
| JP | 8-340243 | 12/1996 |
| JP | 09 090405 | 4/1997 |
| JP | 10-153759 | 6/1998 |
| JP | 10-254410 | 9/1998 |
| JP | 11-202295 | 7/1999 |
| JP | 11-219146 | 8/1999 |
| JP | 11 231805 | 8/1999 |
| JP | 11-282419 | 10/1999 |
| JP | 2000/056847 | 2/2000 |
| JP | 2000-077192 | 3/2000 |
| JP | 2000-81607 | 3/2000 |
| JP | 2000-089198 | 3/2000 |
| JP | 2000-352941 | 12/2000 |
| JP | 2001-134217 | 5/2001 |
| JP | 2001-195014 | 7/2001 |
| JP | 2002-055654 | 2/2002 |
| JP | 2002-91376 | 3/2002 |
| JP | 2002-514320 | 5/2002 |
| JP | 2002-268576 | 9/2002 |
| JP | 2002-278513 | 9/2002 |
| JP | 2002-333862 | 11/2002 |
| JP | 2003-022035 | 1/2003 |
| JP | 2003-076331 | 3/2003 |
| JP | 2003-124519 | 4/2003 |
| JP | 2003-150082 | 5/2003 |
| JP | 2003-177709 | 6/2003 |
| JP | 2003-271095 | 9/2003 |
| JP | 2003-308046 | 10/2003 |
| JP | 2003-317944 | 11/2003 |
| JP | 2004-145197 | 5/2004 |
| JP | 2004-287345 | 10/2004 |
| JP | 2005-057217 | 3/2005 |
| JP | 4-158570 | 10/2008 |
| KR | 2004-0100887 | 12/2004 |
| TW | 342486 | 10/1998 |
| TW | 473622 | 1/2002 |
| TW | 485337 | 5/2002 |
| TW | 502233 | 9/2002 |
| TW | 538650 | 6/2003 |
| TW | 569173 | 1/2004 |
| TW | 1221268 | 9/2004 |
| TW | 200727247 | 7/2007 |
| WO | WO 94/25954 | 11/1994 |
| WO | WO 98/48403 | 10/1998 |
| WO | WO 99/48079 | 9/1999 |
| WO | WO 01/06484 | 1/2001 |
| WO | WO 01/27910 A1 | 4/2001 |
| WO | WO 02/067327 A | 8/2002 |
| WO | WO 03/001496 A1 | 1/2003 |
| WO | WO 03/034389 A | 4/2003 |
| WO | WO 03/058594 A1 | 7/2003 |
| WO | WO 03/063124 | 7/2003 |
| WO | WO 03/077231 | 9/2003 |
| WO | WO 03/105117 | 12/2003 |
| WO | WO 2004/003877 | 1/2004 |
| WO | WO 2004/025615 A | 3/2004 |
| WO | WO 2004/034364 | 4/2004 |
| WO | WO 2004/047058 | 6/2004 |
| WO | WO 2004/104975 A1 | 12/2004 |
| WO | WO 2005/022498 | 3/2005 |
| WO | WO 2005/022500 A | 3/2005 |
| WO | WO 2005/029455 | 3/2005 |
| WO | WO 2005/029456 | 3/2005 |
| WO | WO 2005/055185 | 6/2005 |
| WO | WO 2006/000101 A1 | 1/2006 |
| WO | WO 2006/053424 | 5/2006 |
| WO | WO 2006/063448 A | 6/2006 |
| WO | WO 2006/084360 | 8/2006 |
| WO | WO 2006/137337 | 12/2006 |
| WO | WO 2007/003877 A | 1/2007 |
| WO | WO 2007/079572 | 7/2007 |
| WO | WO 2007/120849 A2 | 10/2007 |
| WO | WO 2009/055920 | 5/2009 |
| WO | WO 2010/023270 | 3/2010 |
| WO | WO 2011/041224 A1 | 4/2011 |

OTHER PUBLICATIONS

Alexander et al.: "Pixel circuits and drive schemes for glass and elastic AMOLED displays"; dated Jul. 2005 (9 pages).
Alexander et al.: "Unique Electrical Measurement Technology for Compensation, Inspection, and Process Diagnostics of AMOLED HDTV"; dated May 2010 (4 pages).
Ashtiani et al.: "AMOLED Pixel Circuit With Electronic Compensation of Luminance Degradation"; dated Mar. 2007 (4 pages).
Chaji et al.: "A Current-Mode Comparator for Digital Calibration of Amorphous Silicon AMOLED Displays"; dated Jul. 2008 (5 pages).
Chaji et al.: "A fast settling current driver based on the CCII for AMOLED displays"; dated Dec. 2009 (6 pages).
Chaji et al.: "A Low-Cost Stable Amorphous Silicon AMOLED Display with Full V~T- and V~O~L~E~D Shift Compensation"; dated May 2007 (4 pages).
Chaji et al.: "A low-power driving scheme for a-Si:H active-matrix organic light-emitting diode displays"; dated Jun. 2005 (4 pages).
Chaji et al.: "A low-power high-performance digital circuit for deep submicron technologies"; dated Jun. 2005 (4 pages).
Chaji et al.: "A novel a-Si:H AMOLED pixel circuit based on short-term stress stability of a-Si:H TFTs"; dated Oct. 2005 (3 pages).
Chaji et al.: "A Novel Driving Scheme and Pixel Circuit for AMOLED Displays"; dated Jun. 2006 (4 pages).
Chaji et al.: "A novel driving scheme for high-resolution large-area a-Si:H AMOLED displays"; dated Aug. 2005 (4 pages).
Chaji et al.: "A Stable Voltage-Programmed Pixel Circuit for a-Si:H AMOLED Displays"; dated Dec. 2006 (12 pages).
Chaji et al.: "A Sub-μA fast-settling current-programmed pixel circuit for AMOLED displays"; dated Sep. 2007.
Chaji et al.: "An Enhanced and Simplified Optical Feedback Pixel Circuit for AMOLED Displays"; dated Oct. 2006.
Chaji et al.: "Compensation technique for DC and transient instability of thin film transistor circuits for large-area devices"; dated Aug. 2008.
Chaji et al.: "Driving scheme for stable operation of 2-TFT a-Si AMOLED pixel"; dated Apr. 2005 (2 pages).
Chaji et al.: "Dynamic-effect compensating technique for stable a-Si:H AMOLED displays"; dated Aug. 2005 (4 pages).
Chaji et al.: "Electrical Compensation of OLED Luminance Degradation"; dated Dec. 2007 (3 pages).
Chaji et al.: "eUTDSP: a design study of a new VLIW-based DSP architecture"; dated May 2003 (4 pages).
Chaji et al.: "Fast and Offset-Leakage Insensitive Current-Mode Line Driver for Active Matrix Displays and Sensors"; dated Feb. 2009 (8 pages).
Chaji et al.: "High Speed Low Power Adder Design With a New Logic Style: Pseudo Dynamic Logic (SDL)"; dated Oct. 2001 (4 pages).
Chaji et al.: "High-precision, fast current source for large-area current-programmed a-Si flat panels"; dated Sep. 2006 (4 pages).
Chaji et al.: "Low-Cost AMOLED Television with IGNIS Compensating Technology"; dated May 2008 (4 pages).
Chaji et al.: "Low-Cost Stable a-Si:H AMOLED Display for Portable Applications"; dated Jun. 2006 (4 pages).
Chaji et al.: "Low-Power Low-Cost Voltage-Programmed a-Si:H AMOLED Display"; dated Jun. 2008 (5 pages).
Chaji et al.: "Merged phototransistor pixel with enhanced near infrared response and flicker noise reduction for biomolecular imaging"; dated Nov. 2008 (3 pages).

(56) References Cited

OTHER PUBLICATIONS

Chaji et al.: "Parallel Addressing Scheme for Voltage-Programmed Active-Matrix OLED Displays"; dated May 2007 (6 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High-Resolution a-Si:H AMOLED Displays"; dated Oct. 2008 (6 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated 2008 (177 pages).
European Search Report and Written Opinion for Application No. 08 86 5338 mailed Nov. 2, 2011 (7 pages).
European Search Report for EP Application No. EP 10 16 6143, dated Sep. 3, 2010 (2 pages).
European Search Report for European Application No. 11739485.8-1904 dated Aug. 6, 2013, (14 pages).
European Search Report for European Application No. EP 011 12 2313 dated Sep. 14, 2005 (4 pages).
European Search Report for European Application No. EP 04 78 6661 dated Mar. 9, 2009.
European Search Report for European Application No. EP 05 75 9141 dated Oct. 30, 2009.
European Search Report for European Application No. EP 05 81 9617 dated Jan. 30, 2009.
European Search Report for European Application No. EP 05 82 1114 dated Mar. 27, 2009 (2 pages).
European Search Report for European Application No. EP 06 70 5133 dated Jul. 18, 2008.
European Search Report for European Application No. EP 06 72 1798 dated Nov. 12, 2009 (2 pages).
European Search Report for European Application No. EP 07 71 9579 dated May 20, 2009.
European Search Report for European Application No. EP 07 81 5784 dated Jul. 20, 2010 (2 pages).
European Search Report for European Application No. EP 07710608.6 dated Mar. 19, 2010 (7 pages).
European Search Report mailed Mar. 26, 2012 in corresponding European Patent Application No. 10000421.7 (6 pages).
European Search Report, Application No. 10834294.0-1903, dated Apr. 8, 2013, (9 pages).
European Supplementary Search Report corresponding to European Application No. EP 04786662 dated Jan. 19, 2007 (2 pages).
Extended European Search Report mailed Apr. 27, 2011 issued during prosecution of European patent application No. 09733076.5 (13 pages).
Extended European Search Report mailed Aug. 6, 2013, issued in European Patent Application No. 11739485.8 (14 page).
Extended European Search Report mailed Jul. 11, 2012 which issued in corresponding European Patent Application No. 11191641.7 (14 pages).
Extended European Search Report mailed Nov. 29, 2012, issued in European Patent Application No. 11168677.0 (13 page).
Fossum, Eric R.. "Active Pixel Sensors: Are CCD's Dinosaurs?" SPIE: Symposium on Electronic Imaging. Feb. 1, 1993 (13 pages).
Goh et al., "A New a-Si:H Thin Film Transistor Pixel Circul for Active-Matrix Organic Light-Emitting Diodes", IEEE Electron Device Letters, vol. 24, No. 9, Sep. 2003, 4 pages.
International Preliminary Report on Patentability for International Application No. PCT/CA2005/001007 dated Oct. 16, 2006, 4 pages.
International Search Report corresponding to co-pending International Patent Application Serial No. PCT/IB2013/054251, Canadian Intellectual Property Office, dated Sep. 11, 2013; (4 pages).
International Search Report corresponding to International Application No. PCTIB2011/050502, dated Jun. 27, 2011 (6 pages).
International Search Report corresponding to International Application No. PCT/CA2004/001742, Canadian Patent Office, dated Feb. 21, 2005 (2 pages).
International Search Report corresponding to International Application No. PCT/IB2010/055541 filed Dec. 1, 2010, dated May 26, 2011; 5 pages.
International Search Report corresponding to International Application No. PCT/IB2011/055135, Canadian Patent Office, dated Apr. 16, 2012 (5 pages).
International Search Report for Application No. PCT/IB2010/055486, Dated Apr. 19, 2011, 5 pages.
International Search Report for International Application No. PCT/CA02/00180 dated Jul. 31, 2002 (3 pages).
International Search Report for International Application No. PCT/CA2004/001741 dated Feb. 21, 2005.
International Search Report for International Application No. PCT/CA2005/001844 dated Mar. 28, 2006 (2 pages).
International Search Report for International Application No. PCT/CA2005/001007 dated Oct. 18, 2005.
International Search Report for International Application No. PCT/CA2007/000652 dated Jul. 25, 2007.
International Search Report for International Application No. PCT/CA2008/002307, mailed Apr. 28, 2009 (3 pages).
International Search Report for International Application No. PCT/CA2006/000177 dated Jun. 2, 2006.
International Search Report for PCT Application No. PCT/CA2009/001769, dated Apr. 8, 2010 (3 pages).
International Search Report mailed Dec. 3, 2002, issued in International Patent Application No. PCT/JP02/09668 (4 pages).
International Search Report mailed Jul. 30, 2009 for International Application No. PCT/CA2009/000501 (4 pages).
International Search Report mailed Mar. 21, 2006 issued in International Patent Application No. PCT/CA2005/001897 (2 pages).
International Search Report, PCT/IB2012/052372, mailed Sep. 12, 2012 (3 pages).
International Searching Authority Search Report, PCT/IB2010/055481, dated Apr. 7, 2011, 3 pages.
International Searching Authority Search Report, PCT/IB2011/051103, dated Jul. 8, 2011, 3 pages.
International Written Opinion corresponding International Patent Application Serial No. PCT/IB2013/054251, Canadian Intellectual Property Office, dated Sep. 11, 2013; (5 pages).
International Written Opinion corresponding to International Application No. PCT/CA2004/001742, Canadian Patent Office, dated Feb. 21, 2005 (5 pages).
International Written Opinion corresponding to International Application No. PCT/IB2011/055135, Canadian Patent Office, dated Apr. 16, 2012 (5 pages).
International Written Opinion for Application No. PCT/IB2010/055486, Dated Apr. 19, 2011, 8 pages.
International Written Opinion for International Application No. PCT/CA2009/000501 mailed Jul. 30, 2009 (6 pages).
International Written Opinion mailed Mar. 21, 2006 corresponding to International Patent Application No. PCT/CA2005/001897 (4 pages).
International Written Opinion of the International Searching Authority corresponding to International Application No. PCT/IB2011/050502, dated Jun. 27, 2011 (7 pages).
International Written Opinion of the International Searching Authority corresponding to International Application No. PCT/IB2010/055541, dated May 26, 2011; 6 pages.
International Written Opinion, PCT/IB2012/052372, mailed Sep. 12, 2012 (5 pages).
Jafarabadiashtiani et al.: "A New Driving Method for a-Si AMOLED Displays Based on Voltage Feedback"; dated 2005 (4 pages).
Kanicki, J., et al. "Amorphous Silicon Thin-Film Transistors Based Active-Matrix Organic Light-Emitting Displays." Asia Display: International Display Workshops, Sep. 2001 (pp. 315-318).
Karim, K. S., et al. "Amorphous Silicon Active Pixel Sensor Readout Circuit for Digital Imaging." IEEE: Transactions on Electron Devices. vol. 50, No. 1, Jan. 2003 (pp. 200-208).

(56) References Cited

OTHER PUBLICATIONS

Lee et al.: "Ambipolar Thin-Film Transistors Fabricated by PECVD Nanocrystalline Silicon"; dated 2006 (6 pages).
Ma e y et al: "Organic Light-Emitting Diode/Thin Film Transistor Integration for foldable Displays" Conference record of the 1997 International display research conference and international workshops on LCD technology and emissive technology. Toronto, Sep. 15-19, 1997 (6 pages).
Machine English translation of JP 2002-333862, 49 pages.
Matsueda y et al.: "35.1: 2.5-in. AMOLED with Integrated 6-bit Gamma Compensated Digital Data Driver"; dated May 2004.
Mendes E., et al. "A High Resolution Switch-Current Memory Base Cell." IEEE: Circuits and Systems. vol. 2, Aug. 1999 (pp. 718-721).
Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.
Nathan et al.: "Backplane Requirements for Active Matrix Organic Light Emitting Diode Displays"; dated 2006 (16 pages).
Nathan et al.: "Call for papers second international workshop on compact thin-film transistor (TFT) modeling for circuit simulation"; dated Sep. 2009 (1 page).
Nathan et al.: "Driving schemes for a-Si and LTPS AMOLED displays"; dated Dec. 2005 (11 pages).
Nathan et al.: "Invited Paper: a-Si for AMOLED—Meeting the Performance and Cost Demands of Display Applications (Cell Phone to HDTV)", dated 2006 (4 pages).
Nathan et al.: "Thin film imaging technology on glass and plastic" ICM 2000, Proceedings of the 12$^{th}$ International Conference on Microelectronics, (IEEE Cat. No. 00EX453), Tehran Iran; Oct. 31-Nov. 2, 2000, pp. 11-14, ISBN: 964-360-057-2, p. 13, col. 1, line 11-48; (4 pages).
Office Action in Japanese patent application No. 2006-527247 dated Mar. 15, 2010. (8 pages).
Office Action in Japanese patent application No. 2007-545796 dated Sep. 5, 2011. (8 pages).
Office Action issued in Chinese Patent Application 2009-10246264.4 Dated Jul. 5, 2013; 8 pages.
Partial European Search Report mailed Mar. 20, 2012 which issued in corresponding European Patent Application No. 11191641.7 (8 pages).
Partial European Search Report mailed Sep. 22, 2011 corresponding to European Patent Application No. 11168677.0 (5 pages).
Philipp: "Charge transfer sensing" Sensor Review, vol. 19, No. 2, Dec. 31, 1999, 10 pages.
Rafati et al.: "Comparison of a 17 b multiplier in Dual-rail domino and in Dual-rail D L (D L) logic styles"; dated 2002 (4 pages).
Safavaian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Sanford, James L., et al., "4.2 TFT AMOLED Pixel Circuits and Driving Methods", SID 03 Digest, ISSN/0003, 2003, pp. 10-13.
Search Report for Taiwan Invention Patent Application No. 093128894 dated May 1, 2012. (1 page).
Search Report for Taiwan Invention Patent Application No. 94144535 dated Nov. 1, 2012. (1 page).
Spindler et al., System Considerations for RGBW OLED Displays, Journal of the SID 14/1, 2006, pp. 37-48.
Stewart M. et al., "Polysilicon TFT technology for active matrix oled displays" IEEE transactions on electron devices, vol. 48, No. 5, dated May 2001 (7 pages).
Tatsuya Sasaoka et al., 24.4L; Late-News Paper: A 13.0-inch AM-Oled Display with Top Emitting Structure and Adaptive Current Mode Programmed Pixel Circuit (TAC), SID 01 Digest, (2001), pp. 384-387.
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).
Written Opinion mailed Jul. 30, 2009 for International Application No. PCT/CA2009/000501 (6 pages).
Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.
Yu, Jennifer: "Improve OLED Technology for Display", Ph.D. Dissertation, Massachusetts Institute of Technology, Sep. 2008 (151 pages).
Zhiguo Meng et al; "24.3: Active-Matrix Organic Light-Emitting Diode Display implemented Using Metal-Induced Unilaterally Crystallized Polycrystalline Silicon Thin-Film Transistors", SID 01Digest, (2001), pp. 380-383.

* cited by examiner

PIXEL DRIVER CIRCUIT WITH LOAD-BALANCE IN CURRENT MIRROR CIRCUIT

CROSS REFERENCE TO RELATED APPLICATIONS

This application is a continuation of pending U.S. application Ser. No. 10/554,795, filed Jun. 15, 2006, now allowed, which is a U.S. National Stage of International Application No. PCT/CA2004/001741, filed Sep. 23, 2004, which claims the benefit of Canadian Patent Application No. 2,443,206, filed Sep. 23, 2003, all of which are incorporated herein by reference in their entireties.

FIELD OF INVENTION

Background of the Invention

OLED based displays have gained significant interest recently for many display applications because of their faster response times, larger viewing angles, higher contrast, lighter weight, lower power, and amenability to flexible substrates, as compared to liquid crystal displays (LCDs).

The simplest way of addressing an OLED display is to use a passive matrix format. Although passive matrix addressed OLED displays are already in the marketplace, they do not support the resolution needed for next generation displays, which use high information content (HIC) formats. HIC formats are only possible with an active matrix addressing scheme.

Active matrix addressing involves a layer of backplane electronics, based on thin-film transistors (TFTs). These thin film transistors provide the bias voltage and drive current needed in each OLED pixel and may be fabricated using amorphous silicon (a-Si:H), polycrystalline silicon (poly-Si), organic, polymer, or other transistor technologies. When compared to passive matrix addressing, active matrix addressing uses a lower voltage on each pixel and the current throughout the entire frame period is a low constant value. Thus, active matrix addressing avoids the excessive peak driving and leakage currents associated with passive matrix addressing. This increases the lifetime of the OLED.

LCDs are electric field driven devices. OLEDs, on the other hand, are current driven devices. Thus, the brightness and stability of the light emitted by a given OLED used in a display is dependent on the operation of the TFTs in the current drive circuit. Thus AMOLED displays are far more sensitive to TFT instabilities including, spatial and temporal variations in transistor threshold voltage, mobility instability, and mismatch issues. These instabilities need to be addressed for widespread use of OLED based displays.

FIG. 1 presents a graph of threshold voltage shift vs. stress voltage for various times for amorphous silicon based TFTs. It is readily apparent from FIG. 1 that the threshold voltage of the transistors varies over time. If these transistors were used in a display, the variation in threshold voltage would likely result in variation in the brightness of the OLED across the array and/or a decrease in brightness over time, both of which are unacceptable.

A simple pixel driver circuit is shown in FIG. 2. This "2T" circuit is a voltage programmed circuit. Such a circuit is not practical for OLED displays as such a circuit cannot compensate for variations in transistor threshold voltage. One solution to this variation in threshold voltage is to use a current programmed circuit to drive the OLED of the pixels. Current programming is a good method for driving AMO-LED displays since the OLED is a current driven device, and its brightness is approximately linearly dependent upon the current flowing through it.

One such current programmed circuit is presented in FIG. 3. This circuit incorporates a current-mirror which compensates for any shift or mismatch in the threshold voltage of the drive transistor T4 which ensures that the brightness of the OLED does not decrease over time. This feature of the circuit allows its drive characteristics to be much improved as compared to the 2T circuit of FIG. 2.

When programming the circuit of FIG. 3, $V_{ADDRESS}$ is high and a current $I_{DATA}$ is applied. This current initially flows through transistor T1 and charges capacitor $C_s$. As the capacitor voltage rises, T3 begins to turn on and $I_{DATA}$ starts to flow through T2 and T3 to ground. The capacitor voltage stabilizes at the point when all of $I_{DATA}$ flows through T2 and T3, and none through T1. This process is independent of the threshold voltage $V_T$ of transistors T3 and T4.

The gates of T3 and T4 are connected, so the current flowing through T3 is mirrored in T4. This topology allows us to have on-pixel current gain or attenuation depending on the sizing of T3 and T4, so that the respective data current can be proportionately smaller or larger than the OLED current. In an active matrix array, pixels are scanned and programmed in a row-by-row fashion. The time taken to scan all rows (one frame) is called the frame time. During array operation, the switching TFTs (T1 and T2) are ON only once in the frame time.

However, existing current programmed circuits do not adequately address long-term stability in the OLED drive current due to differential Vt-shift and other bias, temperature, or mechanical stress related degradations and mismatches in the current mirror.

SUMMARY OF THE INVENTION

The present invention relates to a circuit for driving light emitting elements in a display and more particularly relates to a current drive circuit that implements a current mirror wherein each transistor of the current mirror is connected to a load.

It is an object of the invention to provide improved AMOLED Display Backplanes and Pixel Driver Circuits.

Accordingly, it is an object of the present invention to provide pixel current driver circuits for active matrix organic light emitting displays (AMOLED), capable of providing stable and predictable drive currents, in the presence of device degradation and/or mismatch, and changing environmental factors like temperature and mechanical strain. The latter is particularly important for mechanically flexible AMOLED displays.

According to an aspect of the invention a pixel circuit for use in a display comprising a plurality of pixels is provided. The pixel circuit comprises a pixel drive circuit comprising, switching circuitry, a current mirror having a reference transistor and a drive transistor, the reference transistor and the drive transistor each having a first and second node and a gate, the gate of the reference transistor being connected to the gate of the drive transistor; and a capacitor connected between the gate of the reference transistor and a ground potential, and a load connected between the current mirror and a ground potential, the load having a first load element and a second load element, the first load element being connected to the first node of the reference transistor and the second load element being connected to the first node of the drive transistor.

According to another aspect of the invention a pixel circuit for use in a display comprising a plurality of pixels is provided. The pixel circuit comprises a pixel drive circuit comprising, switching circuitry, a current mirror having a reference transistor and a drive transistor, the reference transistor and the drive transistor each having a first and second node and a gate, the gate of the reference transistor being connected to the gate of the drive transistor, the second node of the reference and drive transistors connected to a ground potential, and a capacitor connected between the gate of the reference transistor and a ground potential, and a load connected between the current mirror and a potential.

This summary of the invention does not necessarily describe all features of the invention.

BRIEF DESCRIPTION OF THE DRAWINGS

These and other features of the invention will become more apparent from the following description in which reference is made to the appended drawings wherein.

The above objects and features of the present invention will become more apparent by the following description of the preferred embodiments with reference to the attached drawings.

DETAILED DESCRIPTION

It has been found that the long-term stability of the OLED drive current can be addressed by providing a load to each transistor of the current mirror of a current based drive circuit.

Figure 1:
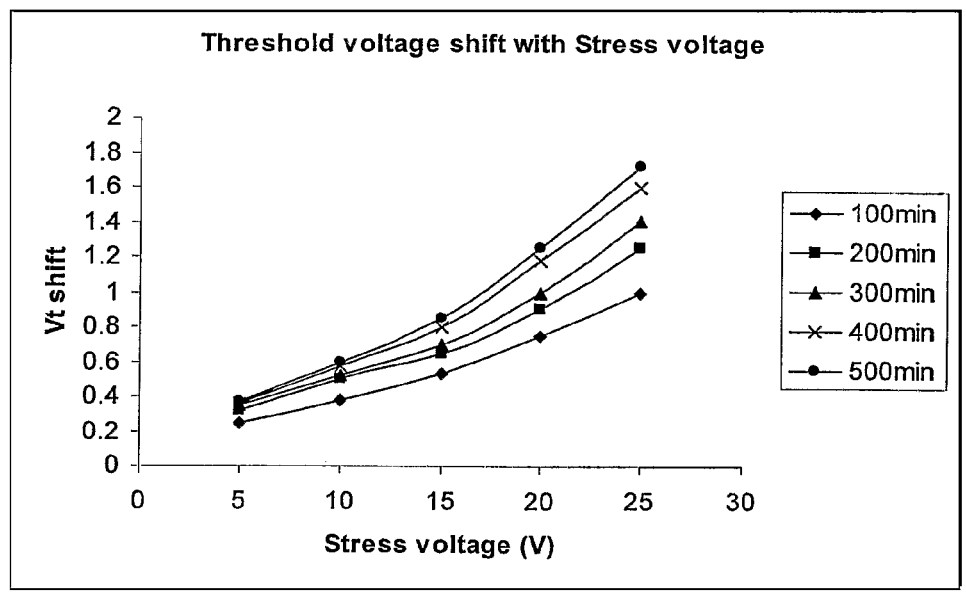
FIG. 1 shows a graph of threshold voltage shift v. gate stress voltage for various times for thin film transistors made from amorphous silicon.
Figure 2:
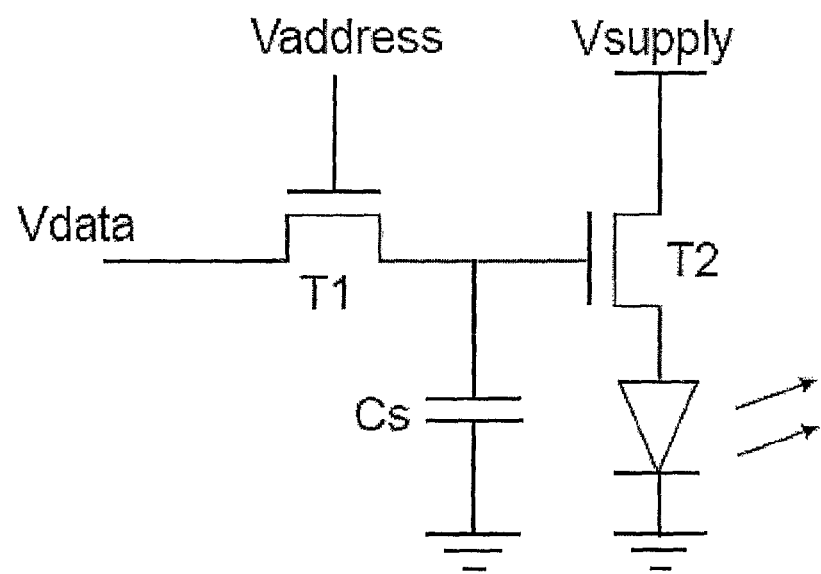
FIG. 2 shows a schematic diagram of a 2T voltage-programmed pixel driver circuit.
Figure 3:
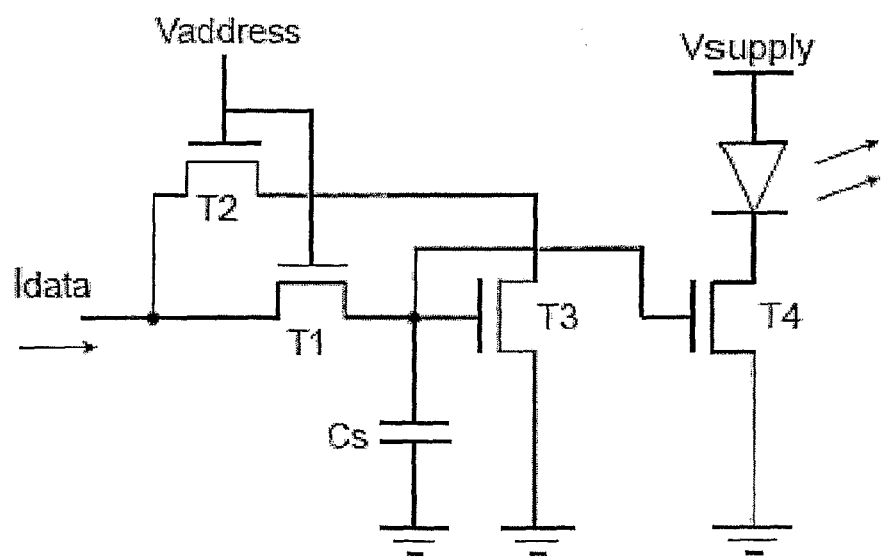
FIG. 3 shows a schematic diagram of a 4T current-programmed driver circuit.
Figure 4:
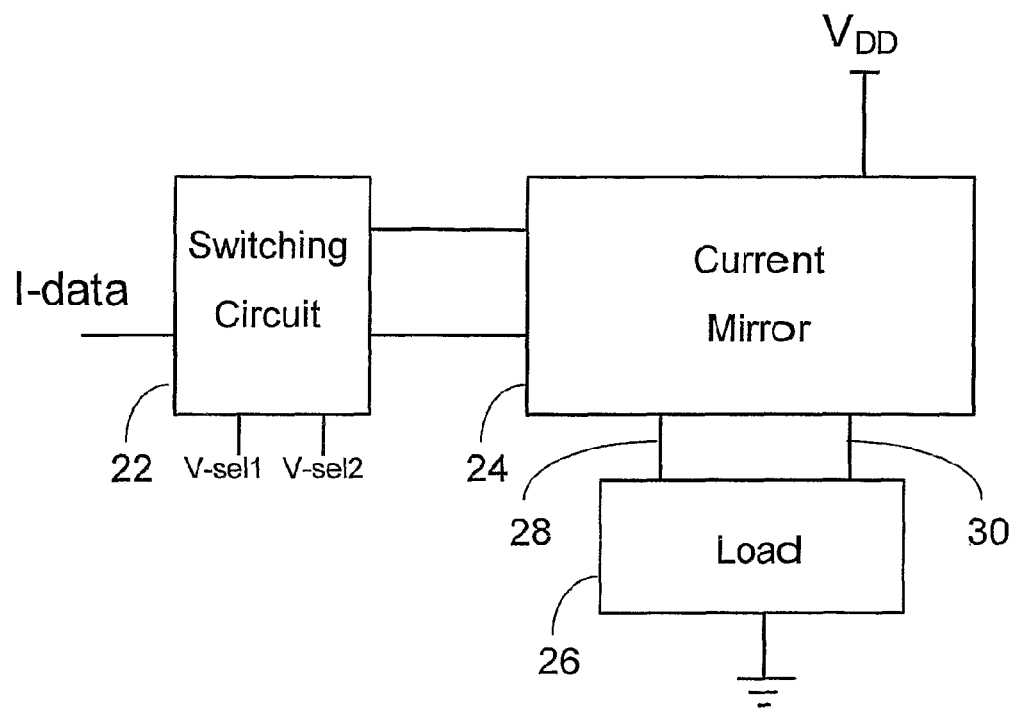
FIG. 4 shows a block diagram of a current-programmed driver circuit according to an embodiment of the invention.

A block diagram of a pixel driver circuit according to one aspect of the invention is shown in FIG. 4. The driver circuit can generally be considered to include a switching circuit 22, a current mirror 24 and a load 26. Of particular note is that the load 26 is configured, with respect to the current mirror 24, such that the two transistors of the current mirror 24 have a load connected to them. In the configuration shown in FIG. 4 the load 26 is connected between the current mirror 24 and ground with connections 28 and 30. Where the connections 28 and 30 are each connected to a node of a transistor of the current mirror and the load 26. This architecture provides for a balancing of the load between the transistors of the current mirror. Embodiments of the invention that implement this architecture will now be presented.

In the embodiment presented in FIG. 4 the switching circuit 22 is connected to two select lines, namely V-sel1 and V-sel2. The embodiments presented in FIGS. 5A-5C, 6A-6C and 7A-7E likewise have two select lines. The switching circuit 22 is further connected to a single data line, I-data.

Figure 5A:
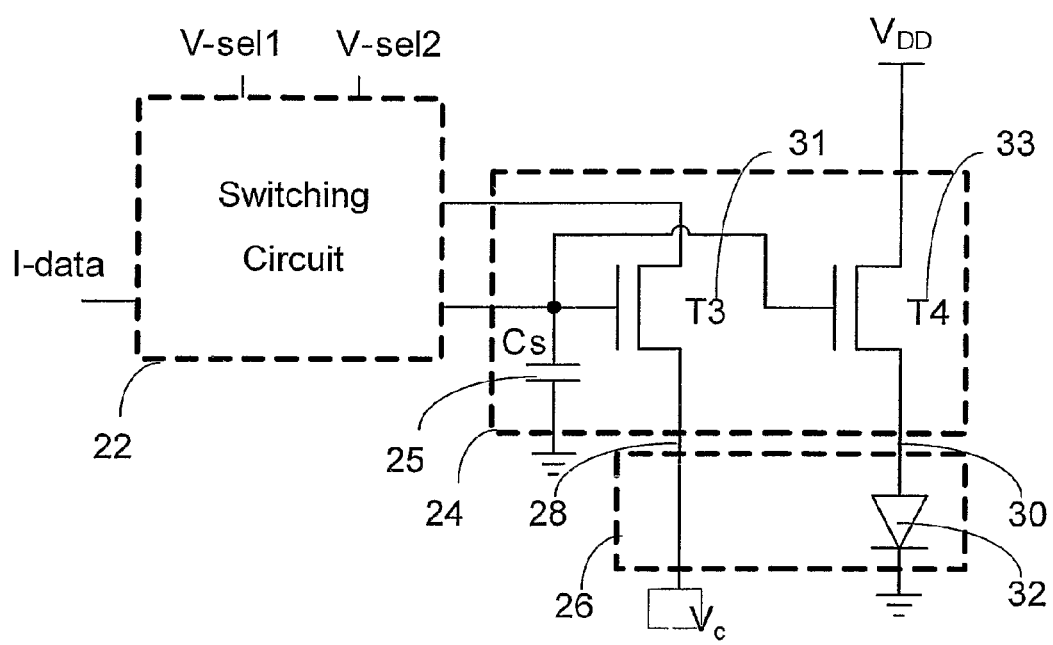
FIG. 5A shows a schematic diagram of a current-programmed driver circuit according to an embodiment of the invention.
Figure 5B:
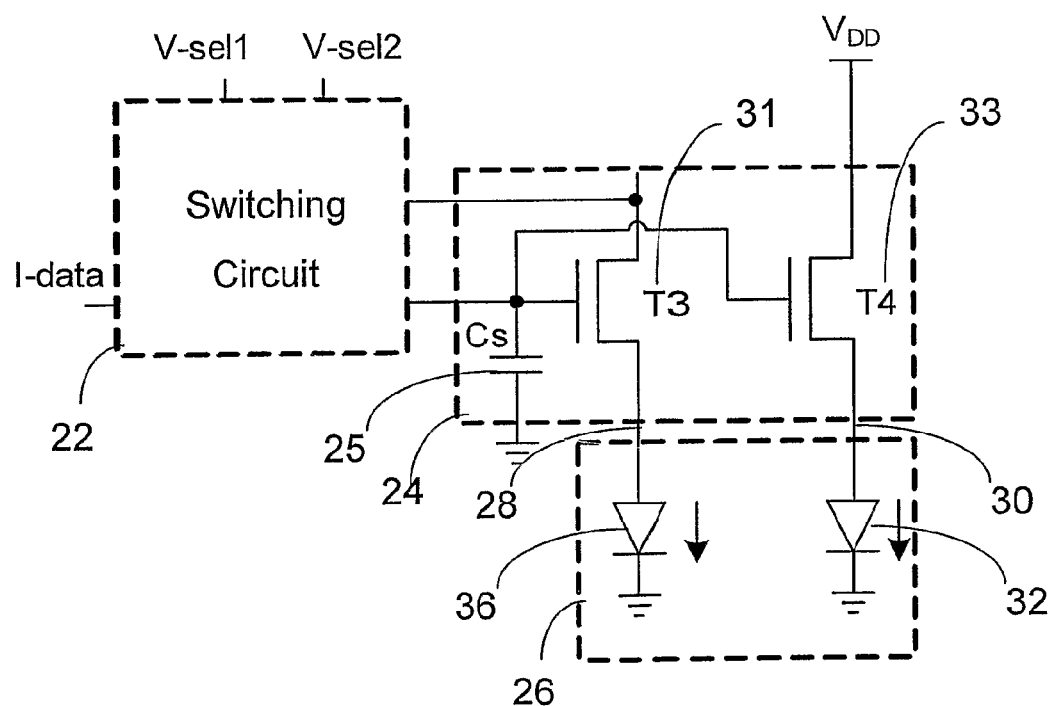
FIG. 5B shows a schematic diagram of a current-programmed driver circuit according to an embodiment of the invention.
Figure 5C:
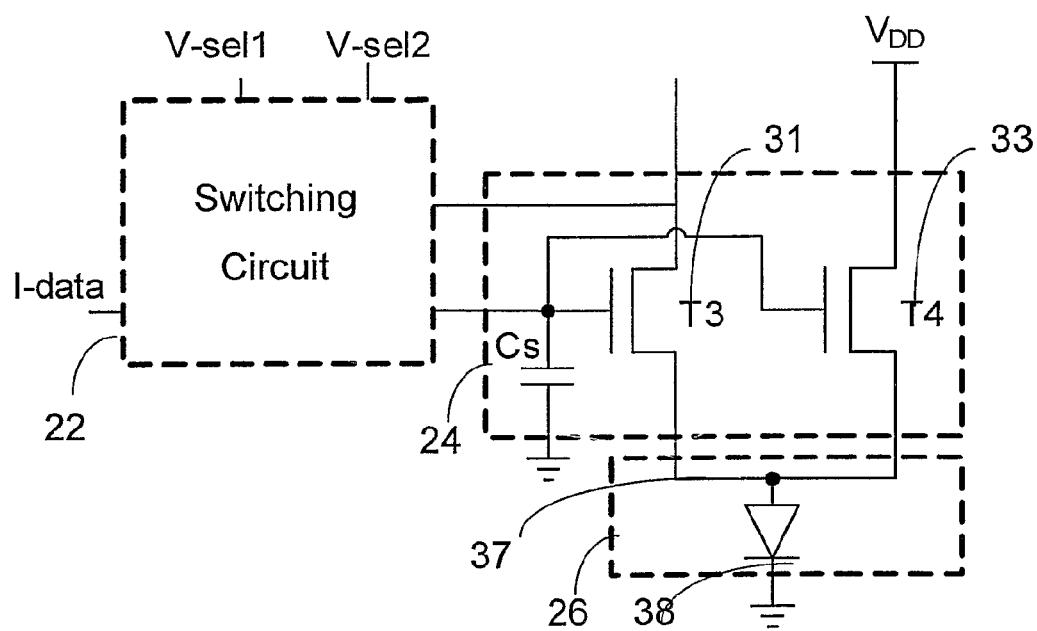
FIG. 5C shows a schematic diagram of a current-programmed driver circuit according to an embodiment of the invention.

The circuits presented in FIGS. 5A to 5C have the same basic architecture as the circuit presented in FIG. 4, i.e. both transistors of the current mirror are connected to the load 26. The circuits of FIGS. 5A to 5C present type and configuration variations for the load 26.

In FIG. 5A the current mirror 24 includes a reference transistor 31, a drive transistor 33. The transistors 31 and 33 are thin film transistors which have an amorphous silicon channel. A storage capacitor 25 is included in the current mirror 24. The gates of the transistor 31 and the transistor 33 are tied together and both connected to a plate of the storage capacitor 25. The other plate of the storage capacitor Cs is connected to ground. The source of the reference transistor 31 is connected to potential Vc and the drain is connected to the switching circuit 22. Connecting the source to the potential Vc allows the two sides of the current mirror to be balanced with proper biasing. The source of the drive transistor 33 is connected to a light emitting diode 32 and the drain is connected to $V_{DD}$. In this embodiment the light emitting diode 32 is an organic light emitting diode (OLED).

FIG. 5B is a schematic diagram of a pixel driver circuit according to another embodiment of the invention. In this embodiment the source of the reference transistor 31 and the drive transistor 33 are connected to light emitting diodes 36 and 32, respectively.

FIG. 5C presents the currently preferred configuration for the load 26. The transistors 31 and 33 are tied together using a connection 37. In FIG. 5C the connection 37 is pictorially located within the load 26. The current embodiment is not limited by this representation. A single OLED 37 is connected to the common connection 37.

Figure 6A:
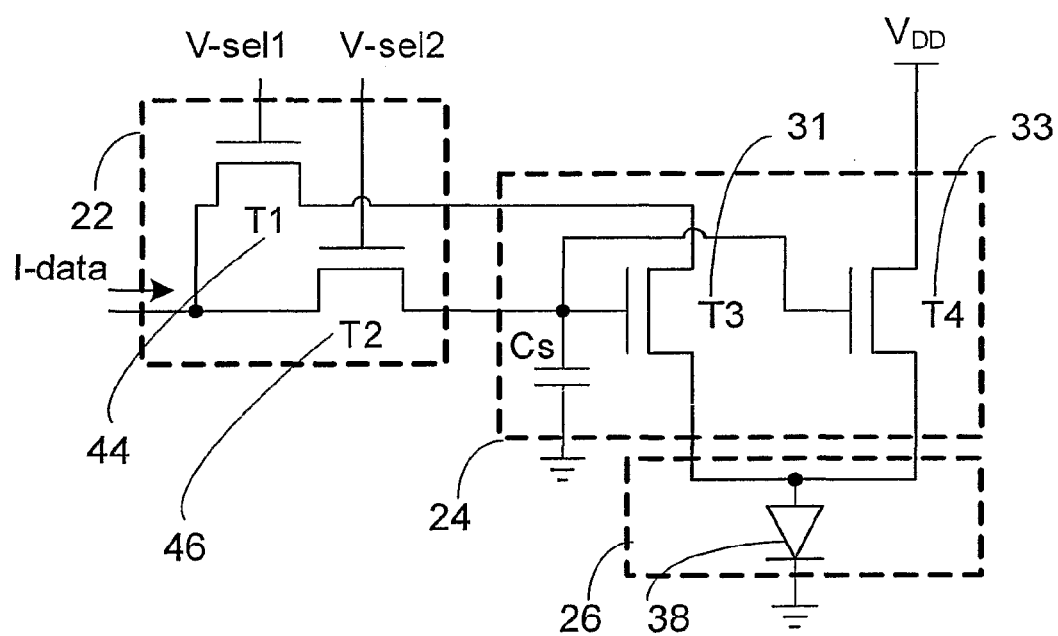
FIG. 6A shows a schematic diagram of a current-programmed driver circuit according to an embodiment of the invention.
Figure 6B:
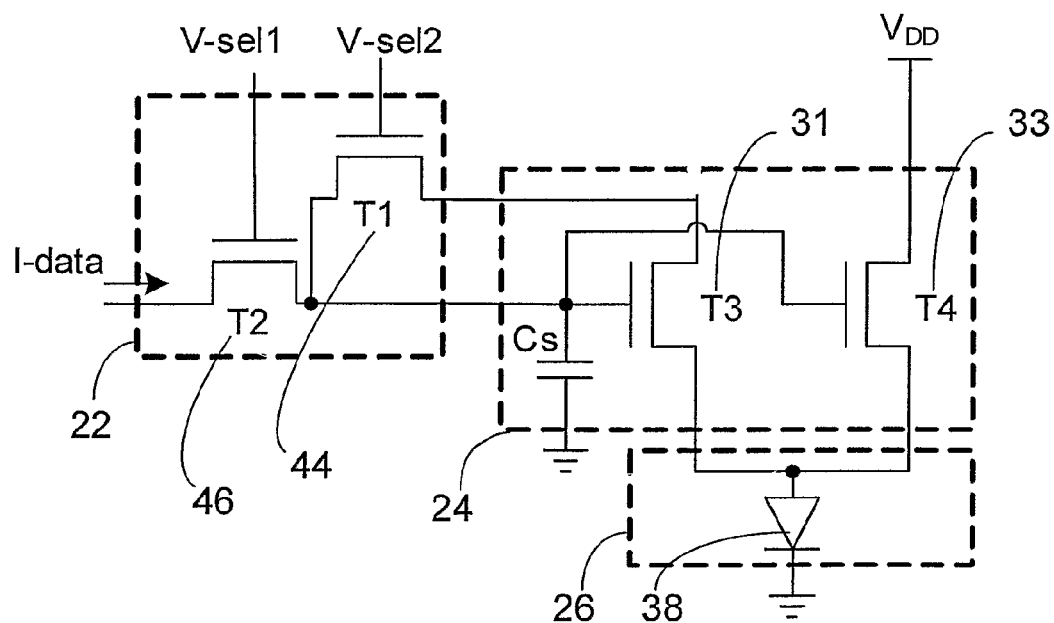
FIG. 6B shows a schematic diagram of a current-programmed driver circuit according to an embodiment of the invention.
Figure 6C:
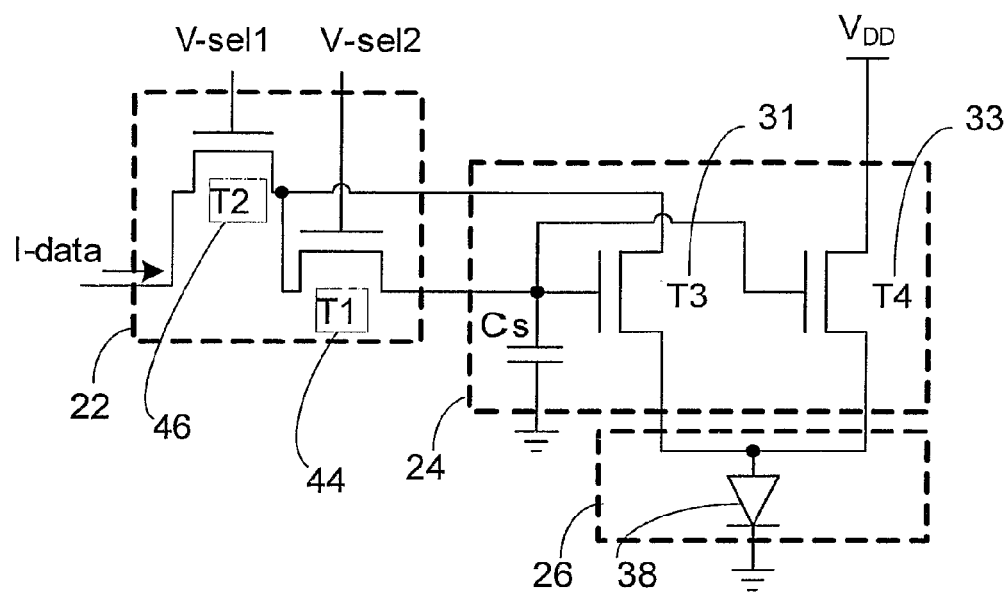
FIG. 6C shows a schematic diagram of a current-programmed driver circuit according to an embodiment of the invention.

FIGS. 6A to 6C present embodiments of the invention wherein the current mirror 24 and the load 26 are the same as the embodiment presented in FIG. 5C while various configurations of the switching circuitry are provided. The switching circuits presented in FIGS. 6A to 6C each have a feedback transistor 44 and a switch transistor 46.

In the circuit presented in FIG. 6A one terminal of the feedback transistor 44 and one terminal of the switch transistor 46 are connected to data line I-data. The second terminal of the feedback transistor 44 is connected to the drain of reference transistor 31 while the second terminal of the switch transistor 46 is connected to the gate of the reference and drive transistors 31 and 33, respectively. Finally, the gate of the feedback transistor 44 and switch transistor 46 is connected to the select line V-sel1 and select line V-sel2, respectively.

In the embodiment presented in FIG. 6B the first terminal of the switch transistor 46 is connected to the data line I-data while the first terminal of the feedback transistor 44 is connected to the second terminal of the switch transistor 46 which is connected to the gate of the reference and drive transistors 31 and 33, respectively. The second terminal of the feedback transistor 44 is connected to the drain of the reference transistor 31. Finally, the gate of the feedback transistor 44 and switch transistor 46 is connected to the select line V-sel2 and select line V-sel1, respectively.

In the embodiment presented in FIG. 6C the first terminal of the switch transistor 46 is connected to the data line I-data while the first terminal of the feedback transistor 44 is connected to the second terminal of the switch transistor 46 which is connected to the drain of the reference transistor 31. The second terminal of the feedback transistor 44 is connected to the gate of the reference and drive transistors 31 and 33, respectively. Finally, the gate of the switch transistor 46 and feedback transistor 44 is connected to the select line V-sel1 and select line V-sel2, respectively.

The circuits that have been considered are embodiments of the circuit presented as a block diagram in FIG. 4. An alternative embodiment of the circuit architecture of FIG. 4 is presented in FIG. 7A. The organization of the switching circuit 22 and the current mirror 24 is the same as the embodiment presented in FIG. 4. In this embodiment the load 26 is arranged such that it is between the potential $V_{DD}$ and the current mirror 24. FIGS. 7B-7E present embodiments of the invention based on the block diagram of FIG. 7A. These embodiments implement the same circuit for the current mirror 24 while the configuration of the load 26 varies.

Figure 7A:
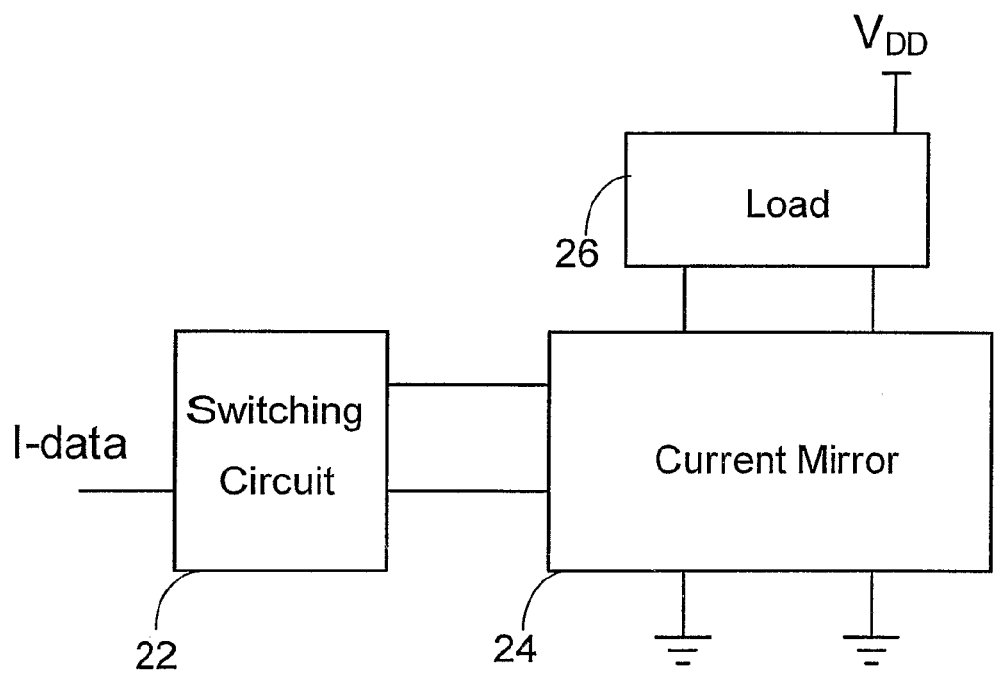
FIG. 7A shows a block diagram of a current-programmed driver circuit according to an embodiment of the invention.
Figure 7B:
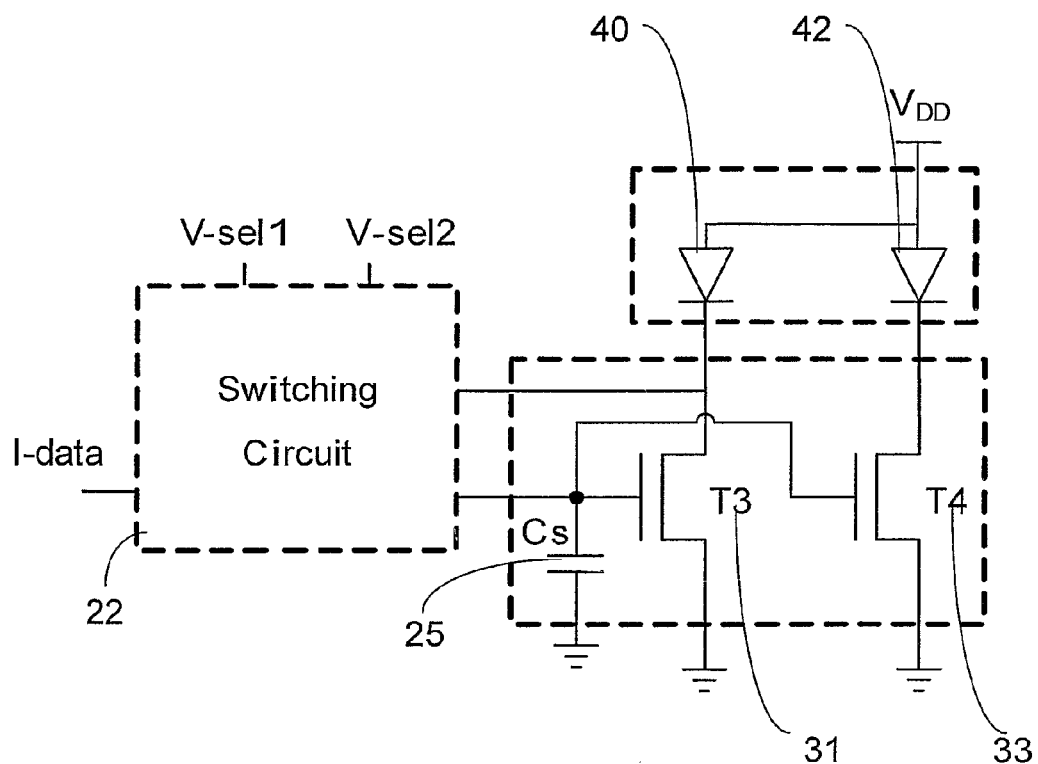
FIG. 7B shows a schematic diagram of a current-programmed driver circuit according to an embodiment of the invention.

In the embodiment presented in FIG. 7B the load 26 includes light emitting diodes 40 and 42. The diodes 40 and 42 are connected between the potential $V_{DD}$ and the drain of reference transistor 31 and drive transistor 33, respectively. The sources of the reference transistor 31 and the drive transistor 33 are connected to ground. The gates of the reference transistor 31 and the drive transistor 33 are tied together and connected to both the switching circuit 22 and a plate of the storage capacitor 25. In the embodiment presented in FIG. 7C the light emitting diode 40 is connected to a potential Vc and the diode 42 is connected to the potential $V_{DD}$. The embodiments presented in FIGS. 7D and 7E differ from the embodiments of FIGS. 7B and 7C, respectively, in that the light emitting diode 40 is replaced with a transistor 47. The gate of transistor 47 is connected to a third select line V-sel3, a first terminalis connected to a potential and a second terminal is connected to the source terminal of reference transistor 31.

Figure 7C:
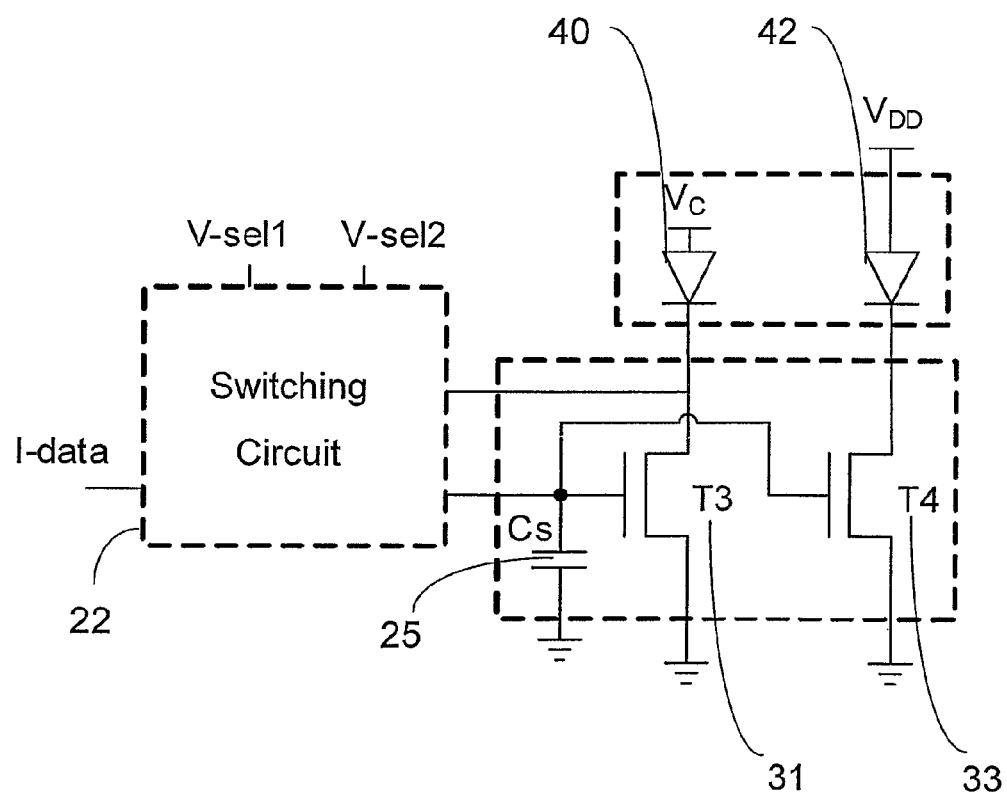
FIG. 7C shows a schematic diagram of a current-programmed driver circuit according to an embodiment of the invention.
Figure 7D:
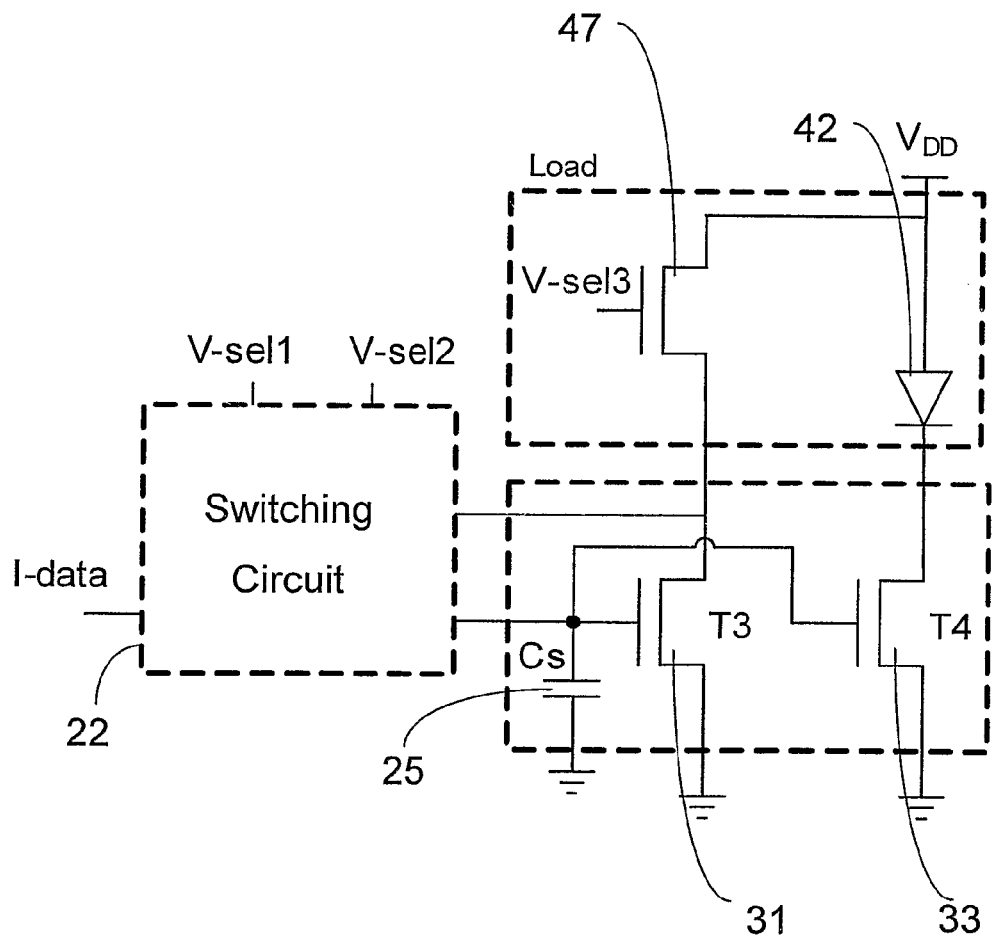
FIG. 7D shows a schematic diagram of a current-programmed driver circuit according to an embodiment of the invention.
Figure 7E:
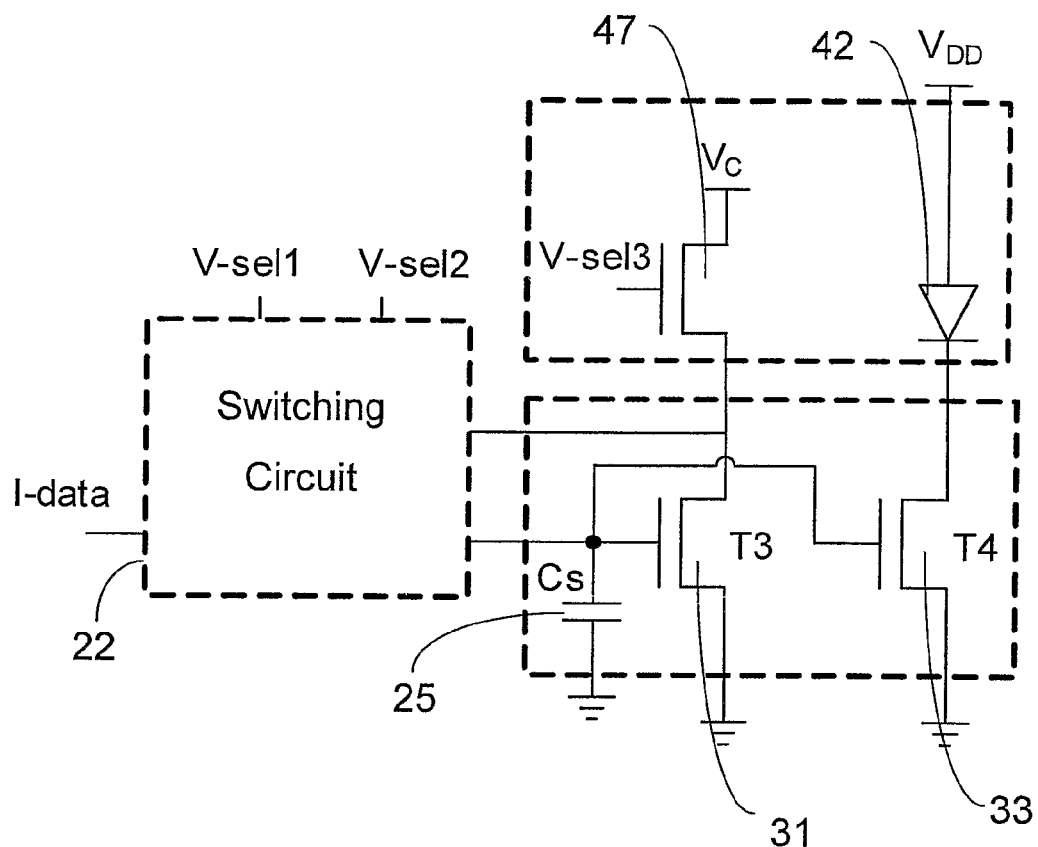
FIG. 7E shows a schematic diagram of a current-programmed driver circuit according to an embodiment of the invention.

In the schematic diagram of FIGS. 5B, 7B, and 7C there are two OLEDs in each pixel. Such a double OLED structure is formed by partitioning the bottom electrode of the OLED of each pixel into two electrodes. Partitioning of the electrode provide for the formation of two OLEDs in each pixel. One of the OLEDs is connected to the drive transistor and the other is connected to the reference transistor. Therefore the load of reference and drive transistors is the same, resulting in a minimization of mismatches between these two transistors. It is noted that the ratio between the areas of the two OLEDs and the gain of the current mirror can be engineered to achieve desired circuit performance.

According to an alternative embodiment of the invention the transistors can be any appropriate material for the fabrication of thin film transistors including polycrystalline silicon, polymer and organic materials. In particular this embodiment considers appropriate changes for including p-type TFTs that are relevant to persons skilled in the art.

According to another alternative embodiment of the invention the pixel drive circuits do not include the capacitor Cs.

According to another alternative embodiment of the invention the switching circuit 22 is appropriate for the use with a single select line.

According to another alternative embodiment of the invention the transistors of the pixel driver circuits may have more than one gate. In particular the transistors may be dual gate transistors.

According to another alternative embodiment of the invention there is more than one driver circuit for a given pixel. In particular there may be three pixel driver circuits as would be appropriate for pixels in an RGB or colour display.

The present invention has been described with regard to one or more embodiments. However, it will be apparent to persons skilled in the art that a number of variations and modifications can be made without departing from the scope of the invention as defined in the claims.

What is claimed is:

1. A pixel driver circuit for use in a display, comprising:
   switching circuitry for providing a reference current input, the switching circuitry including:
     a switch transistor having a gate connected to a first select line, a first terminal connected to a data line, and
     a feedback transistor having a gate connected to a second select line, a first terminal connected to a second terminal of the switch transistor;
   a light emitting device having a first terminal and a second terminal, the second terminal being connected to a first potential; and
   a current mirror for providing a drive current to the light emitting device based on the reference current, the current mirror including:
     a drive transistor for conveying the drive current through the light emitting device and having a first node;
     a reference transistor for receiving the reference current, the reference transistor having a gate connected to a gate of the drive transistor, the reference transistor having a drain terminal connected either to a second terminal of the feedback transistor or to a second terminal of the switch transistor, wherein the first terminal of the light emitting device is connected to the first node and to a source terminal of the reference transistor; and
     a capacitor for storing a program voltage independent of a transistor threshold voltage, the program voltage settling on the capacitor while the reference current is conveyed through the reference transistor, the capacitor having a first terminal connected to both the gate of the drive transistor and the gate of the reference transistor, the capacitor having a second terminal connected to the first potential.

2. The pixel driver circuit according to claim 1, wherein the drain terminal of the reference transistor is connected to the second terminal of the feedback and a source terminal of the reference transistor is connected to a first terminal of the light emitting device.

3. The pixel driver circuit according to claim 2, wherein a second terminal of the light emitting device is connected to a ground potential.

4. The pixel driver circuit according to claim 1, wherein the drain terminal of the reference transistor is connected to the second terminal of the switch transistor and a source terminal of the reference transistor is connected to a first terminal of the light emitting device.

5. The pixel driver circuit according to claim 4, wherein a second terminal of the light emitting device is connected to a ground potential.

6. The pixel driver circuit according to claim 1, wherein the light emitting device is a light emitting diode.

7. The pixel driver circuit according to claim 6, wherein the first potential is a ground potential.

8. The pixel driver circuit according to claim 1, wherein the first potential is a ground potential.

9. The pixel driver circuit according to claim 1, wherein the reference and drive transistors are thin film transistors.

10. The pixel driver circuit according to claim 9, wherein the thin film transistors are amorphous silicon or polycrystalline silicon or organic.

11. The pixel driver circuit according to claim 10, wherein the reference and drive transistors are p-type.

12. The pixel driver circuit according to claim 1, wherein a first terminal of the drive transistor is connected to a supply voltage, and a second terminal of the drive transistor is connected to the light emitting device.

13. The pixel driver circuit according to claim 1, incorporated in an active matrix organic light emitting display (AMOLED).

* * * * *